United States Patent
Lee et al.

(10) Patent No.: US 10,178,503 B2
(45) Date of Patent: Jan. 8, 2019

(54) METHOD FOR CONTROLLING AND ELECTRONIC DEVICE THEREOF

(71) Applicant: Samsung Electronics Co., Ltd., Gyeonggi-do (KR)

(72) Inventors: Kwan-Ho Lee, Seoul (KR); Yong-Sang Yun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/532,410

(22) PCT Filed: Dec. 2, 2015

(86) PCT No.: PCT/KR2015/013017
§ 371 (c)(1),
(2) Date: Jun. 1, 2017

(87) PCT Pub. No.: WO2016/093543
PCT Pub. Date: Jun. 16, 2016

(65) Prior Publication Data
US 2017/0366937 A1    Dec. 21, 2017

(30) Foreign Application Priority Data

Dec. 10, 2014  (KR) .................. 10-2014-0177702

(51) Int. Cl.
*H04W 24/00* (2009.01)
*H04W 4/02* (2018.01)
(Continued)

(52) U.S. Cl.
CPC ......... *H04W 4/023* (2013.01); *H04M 1/7253* (2013.01); *H04W 4/21* (2018.02); *H04W 4/80* (2018.02); *H04M 1/72558* (2013.01)

(58) Field of Classification Search
USPC .................. 455/67.11, 456.3; 345/23, 173
See application file for complete search history.

(56) References Cited

U.S. PATENT DOCUMENTS 8,060,012 B2   11/2011   Sklovsky et al.
8,401,681 B2   3/2013    Rosenblatt et al.
(Continued)

FOREIGN PATENT DOCUMENTS

| | | |
|---|---|---|
| EP | 2 424 309 | 2/2012 |
| EP | 2 458 820 | 5/2012 |
| JP | 2005159607 | 6/2005 |

OTHER PUBLICATIONS

PCT/ISA/210 Search Report issued on PCT/KR2015/013017 (pp. 3).

(Continued)

*Primary Examiner* — David Q Nguyen
(74) *Attorney, Agent, or Firm* — The Farrell Law Firm, P.C.

(57) ABSTRACT

A method for controlling and an electronic device processing the method are provided. The electronic device includes a communication module configured to establish a communication link with a second electronic device, and a control module configured to perform a sharing operation based on at least one of a setting state of an execution screen of the electronic device and the communication module sensing the proximity of the second electronic device, in response to the searching of the second electronic device.

19 Claims, 16 Drawing Sheets

(51) Int. Cl.
*H04M 1/725* (2006.01)
*H04W 4/21* (2018.01)
*H04W 4/80* (2018.01)

(56) References Cited

U.S. PATENT DOCUMENTS

| | | | |
|---|---|---|---|
| 8,458,363 B2 | 6/2013 | Rosenblatt et al. | |
| 8,855,312 B1* | 10/2014 | Hodgman | G06F 21/44 380/270 |
| 9,207,853 B2* | 12/2015 | Lee | G06F 1/1626 |
| 9,740,283 B2* | 8/2017 | Xiang | G06F 3/013 |
| 2007/0004456 A1 | 1/2007 | Shimada | |
| 2009/0267867 A1* | 10/2009 | Gonia | G06F 3/1454 345/1.1 |
| 2010/0259464 A1* | 10/2010 | Chang | G06F 3/1454 345/2.3 |
| 2011/0304561 A1* | 12/2011 | Kim | G06F 3/04886 345/173 |
| 2012/0159472 A1* | 6/2012 | Hong | H04L 12/1813 717/178 |
| 2014/0080421 A1* | 3/2014 | Lee | H04W 48/18 455/67.11 |
| 2014/0123224 A1* | 5/2014 | Nosrati | H04W 12/06 726/3 |
| 2014/0137202 A1 | 5/2014 | Huang et al. | |
| 2014/0187162 A1 | 7/2014 | Mei | |
| 2014/0194066 A1 | 7/2014 | Li | |
| 2015/0067605 A1* | 3/2015 | Zambetti | G06F 3/0485 715/830 |

OTHER PUBLICATIONS

PCT/ISA/237 Written Opinion issued on PCT/KR2015/013017 (pp. 6).

European Search Report dated Nov. 21, 2017 issued in counterpart application No. 15868184.1-1870, 6 pages.

\* cited by examiner

[Fig. 1a]
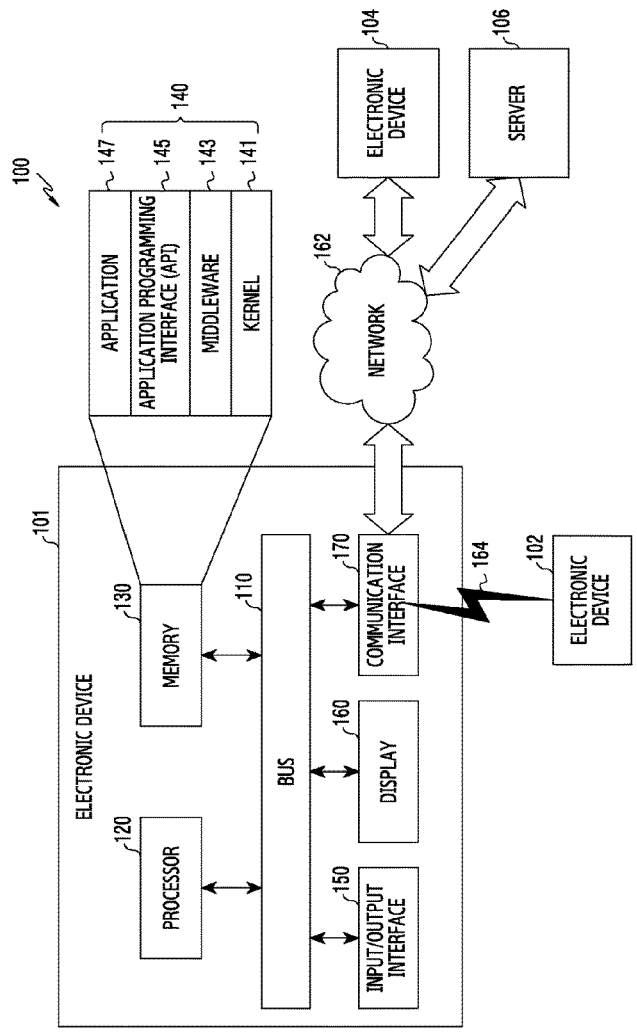
[Fig. 1b]
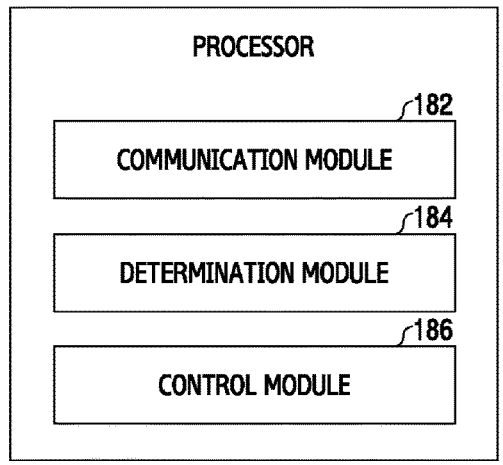

[Fig. 1c]
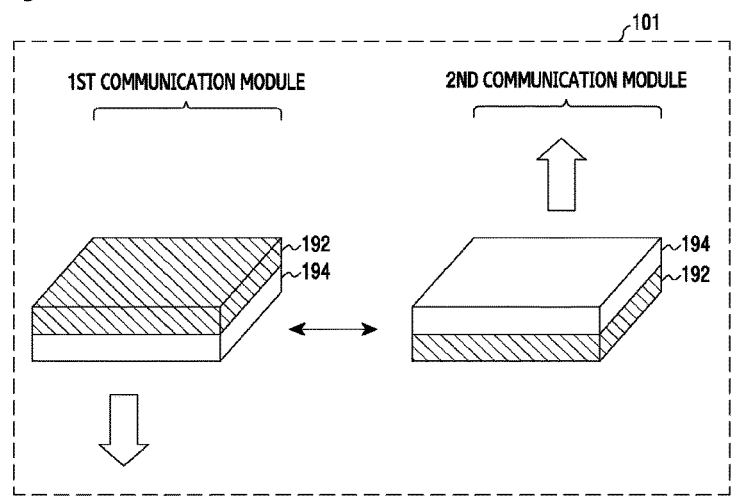
[Fig. 1d]
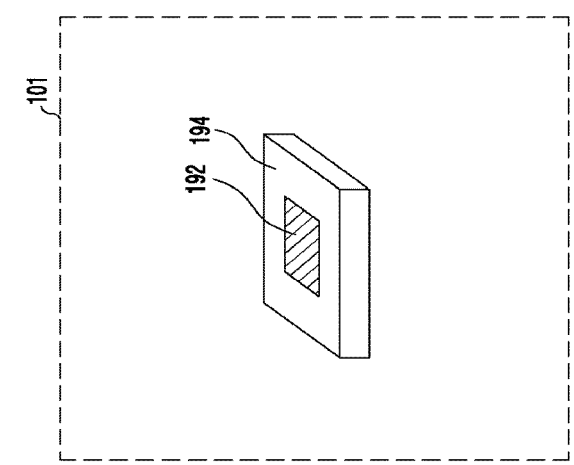
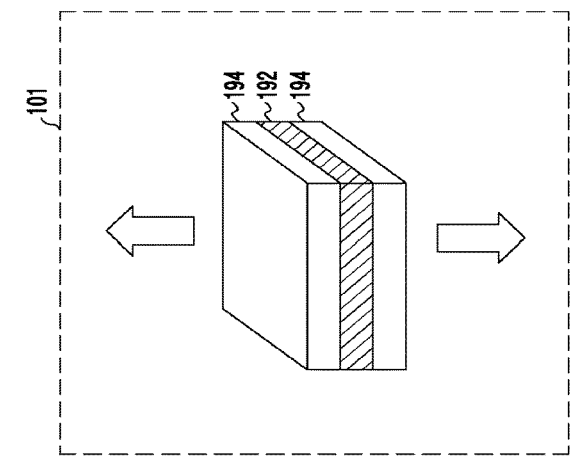

[Fig. 2]
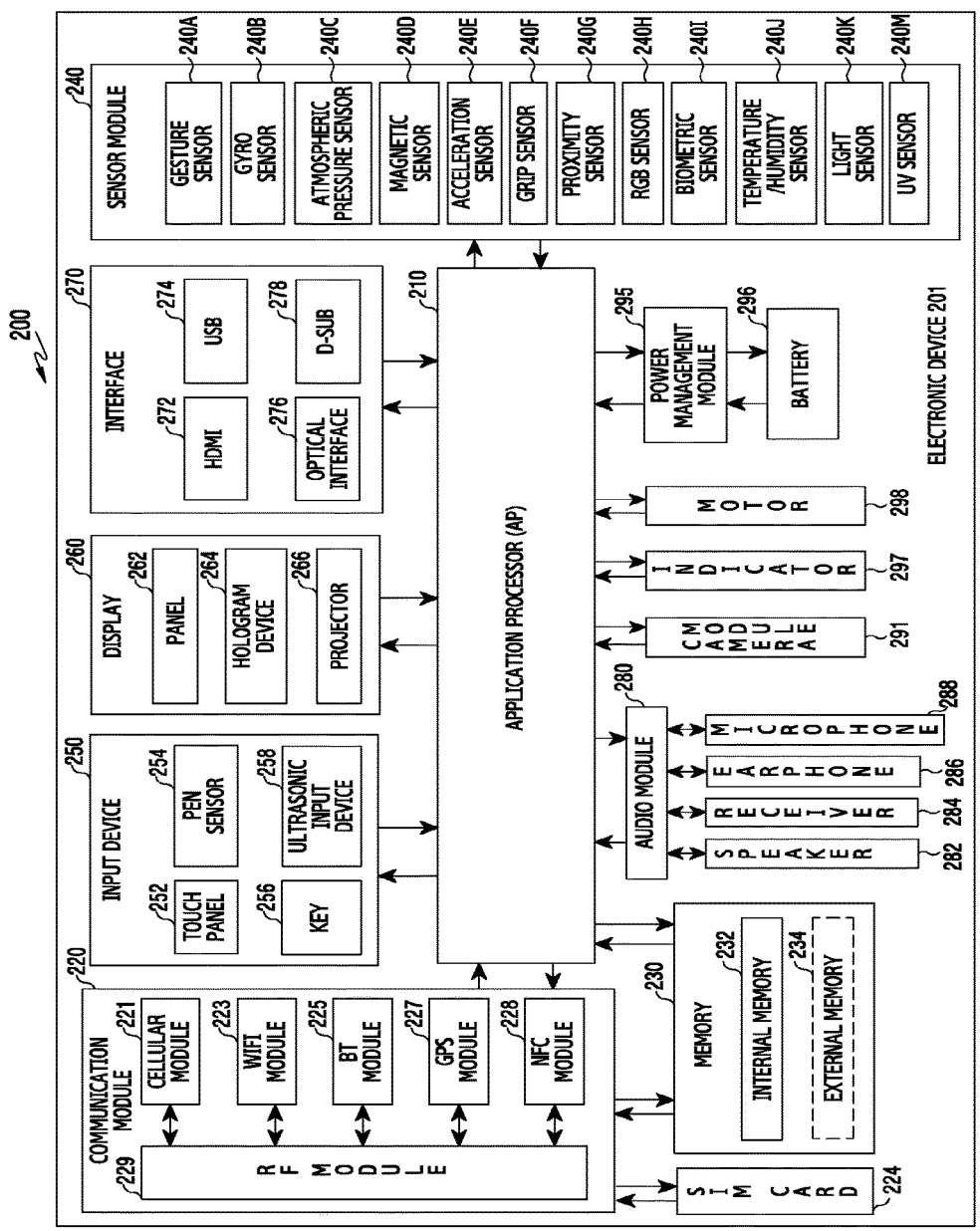

[Fig. 3]
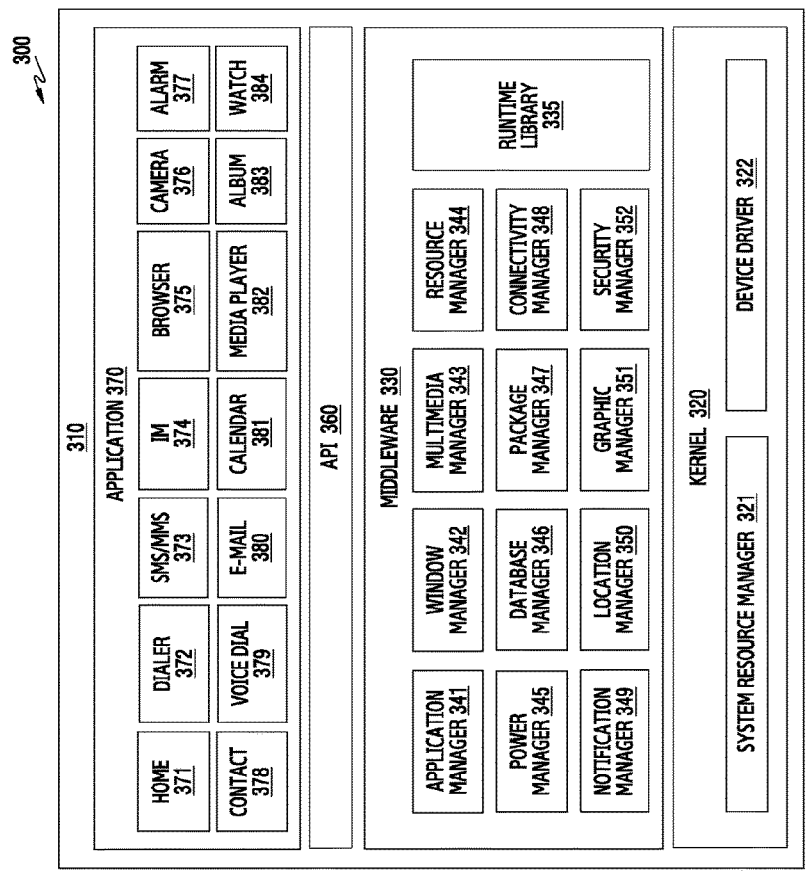
[Fig. 4]
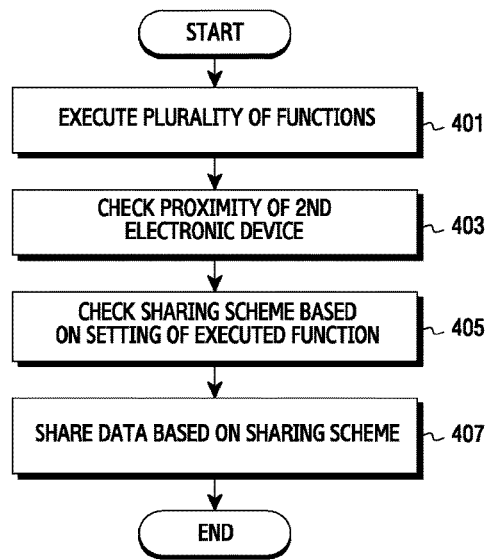

[Fig. 5]
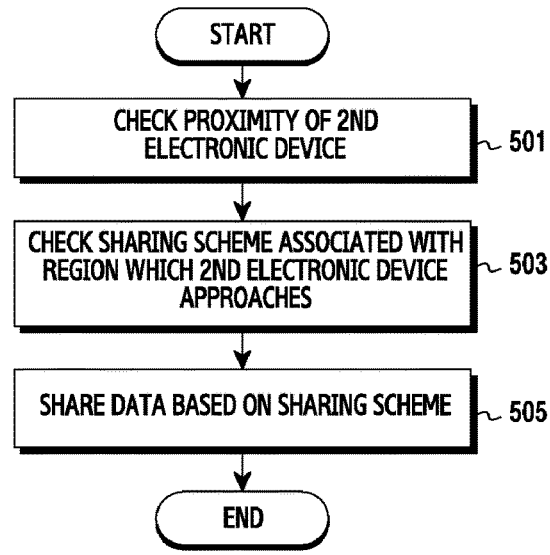
[Fig. 6a]
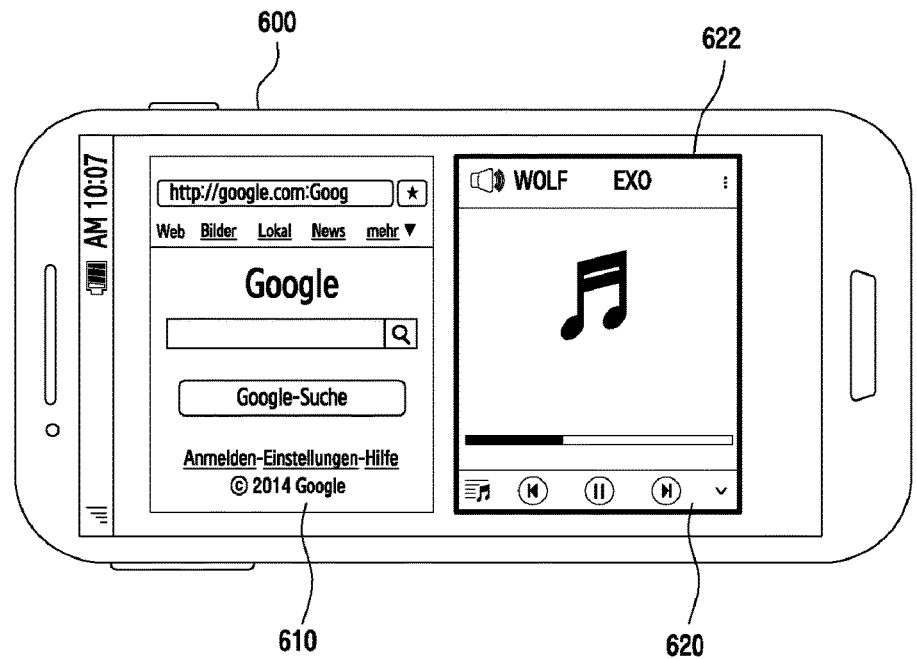

[Fig. 6b]
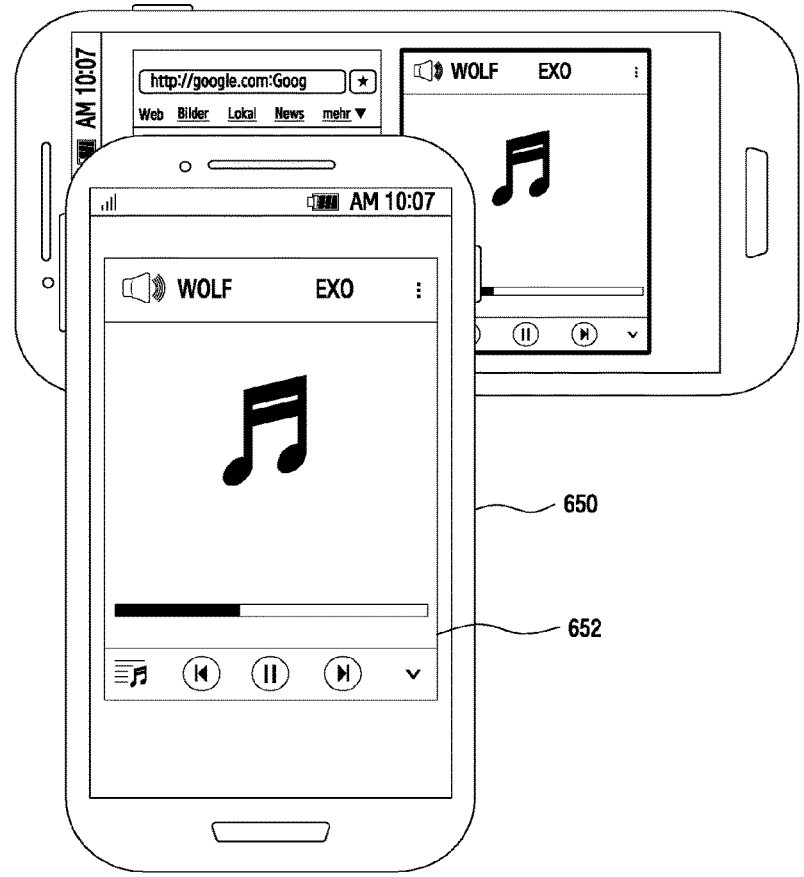
[Fig. 7a]
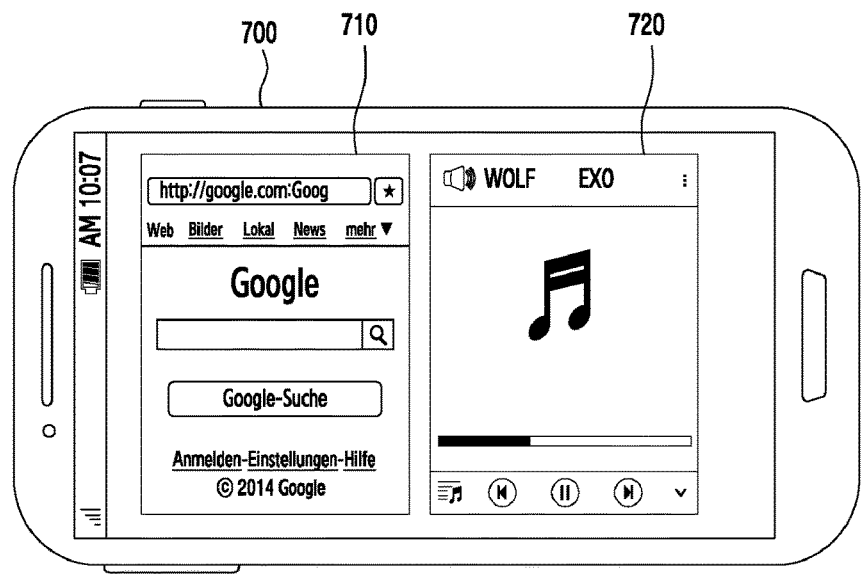

[Fig. 7b]
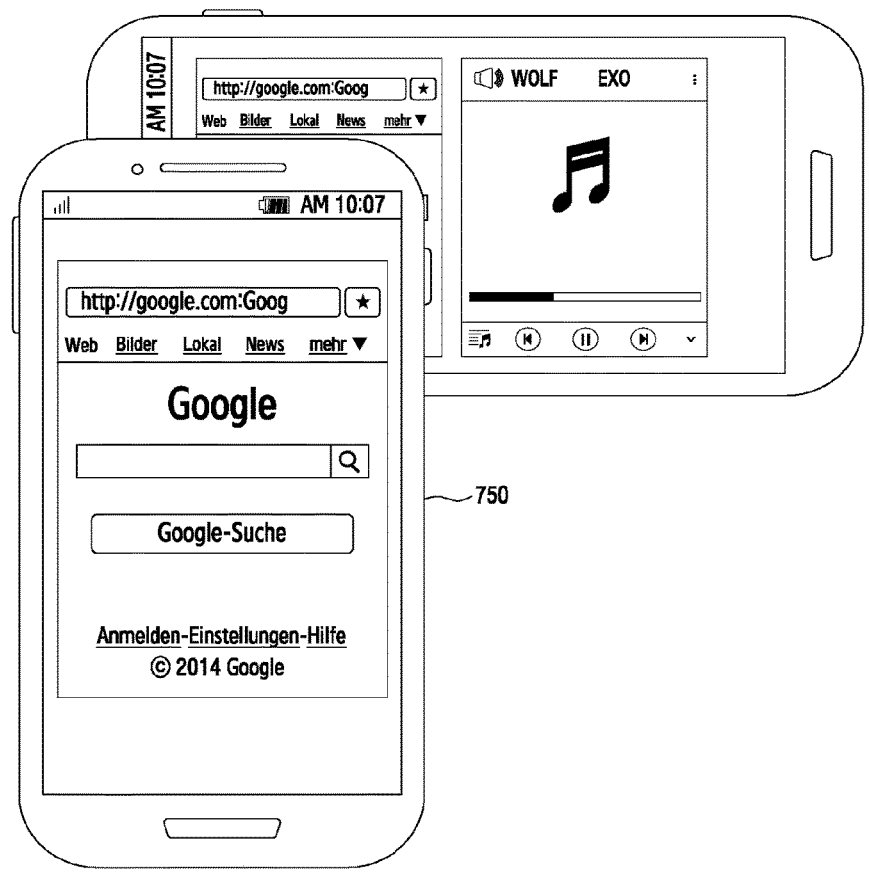

[Fig. 7c]
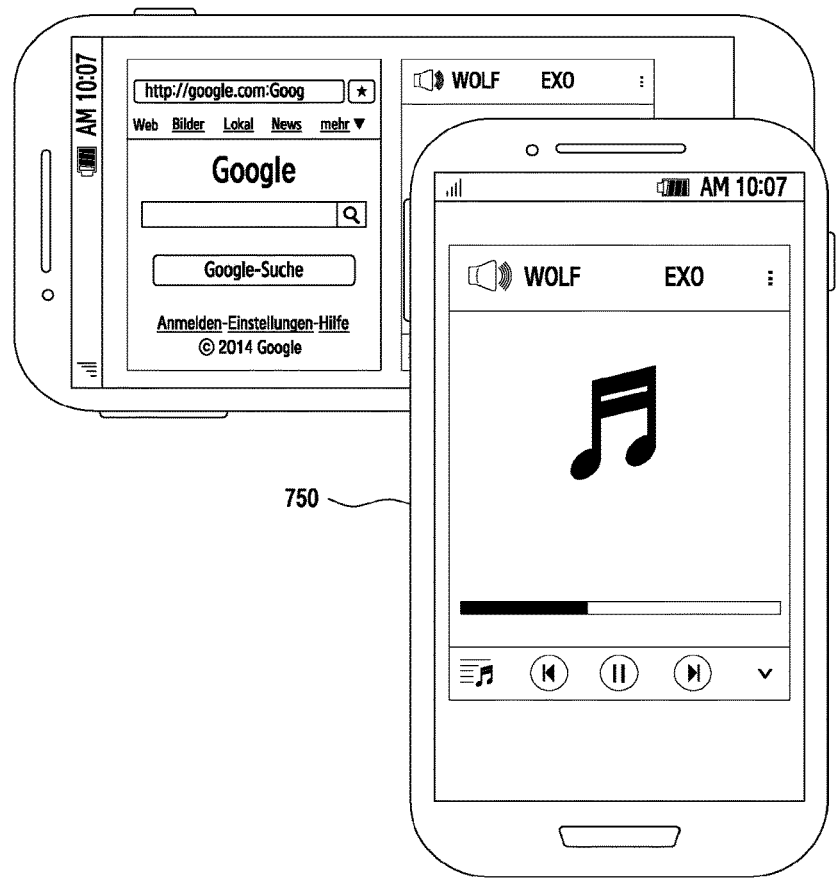
[Fig. 8a]
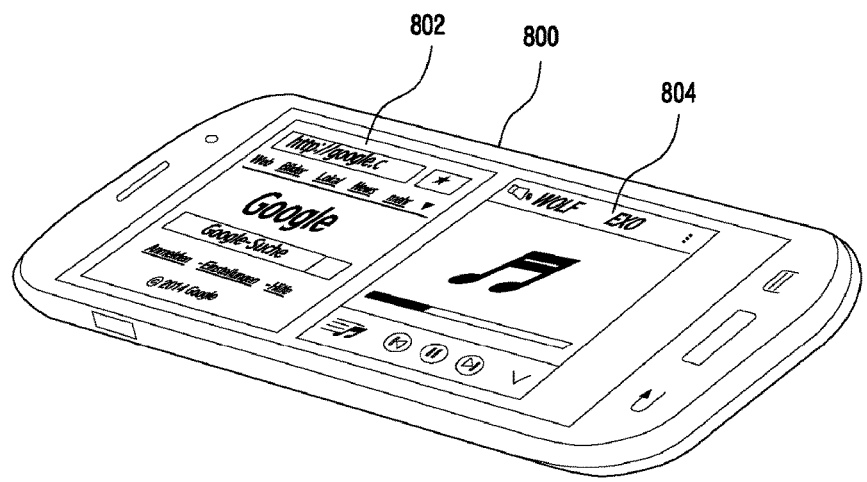

[Fig. 8b]
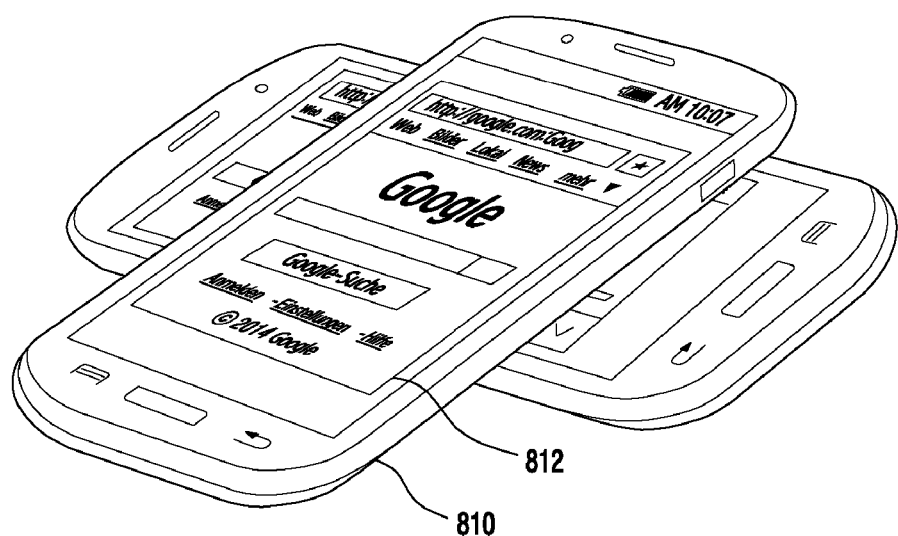
[Fig. 8c]
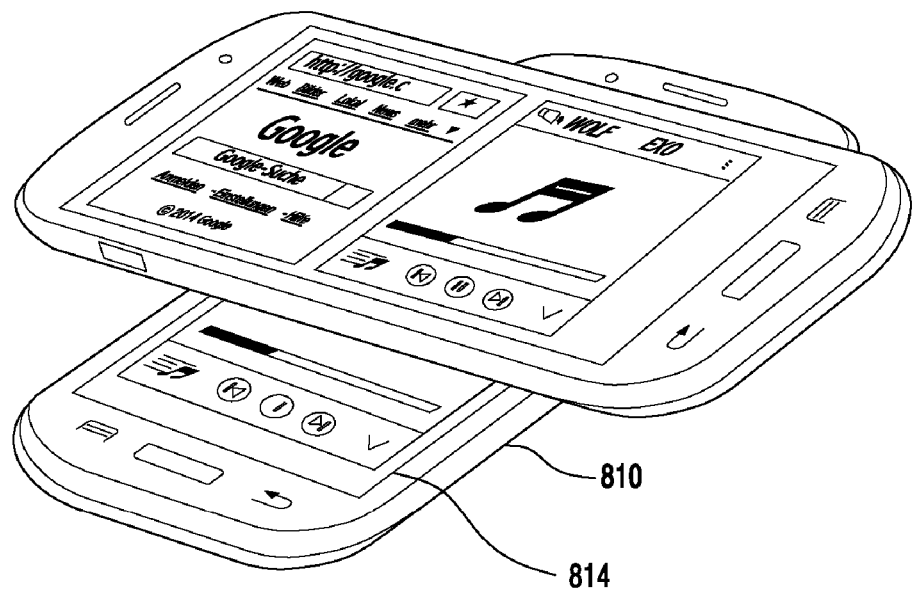

[Fig. 9]
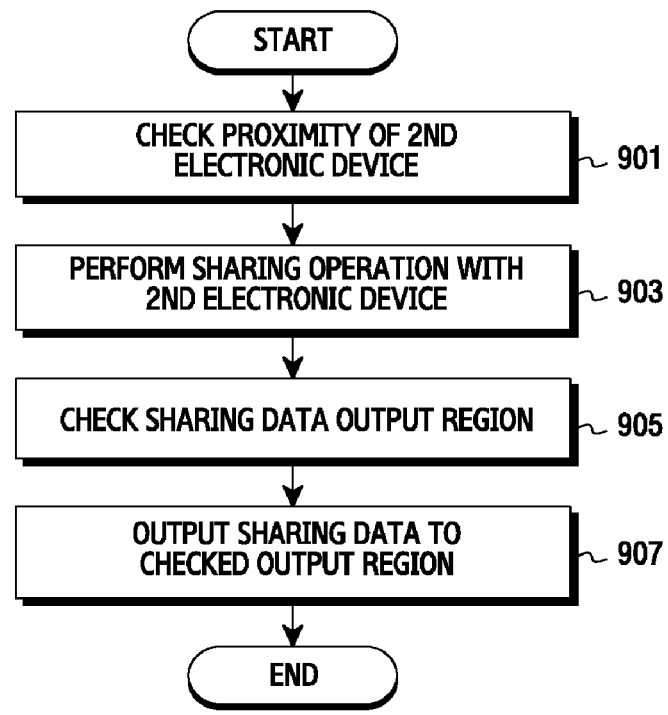

[Fig. 10]
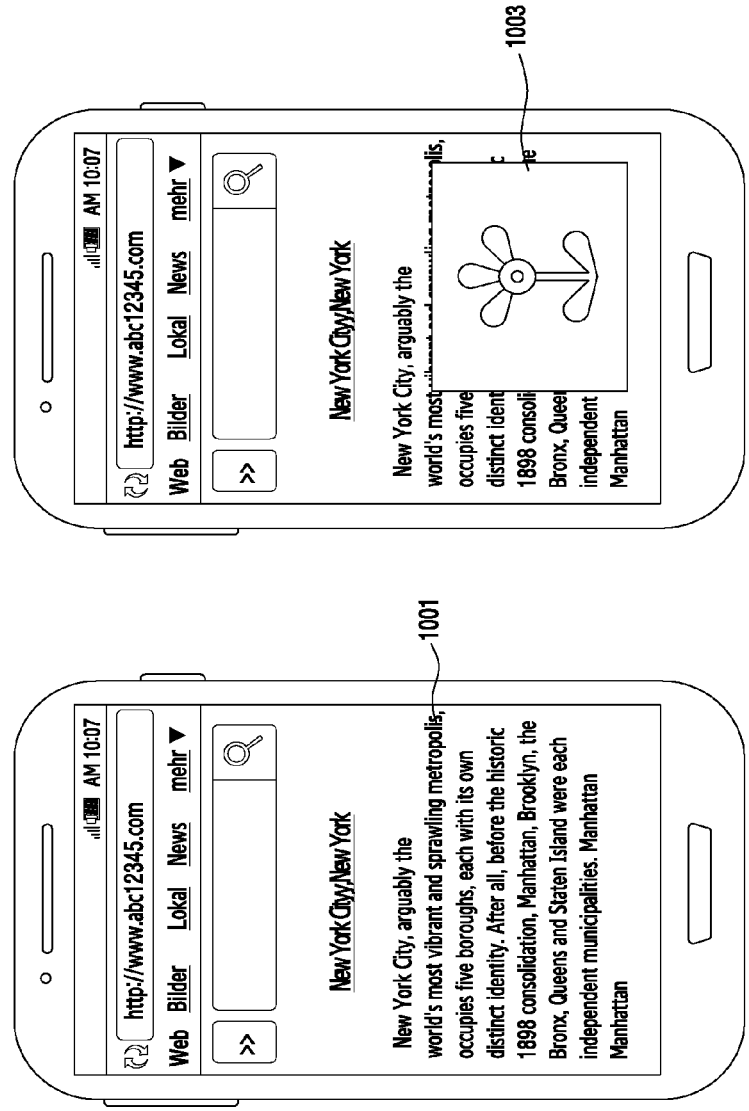

[Fig. 11]
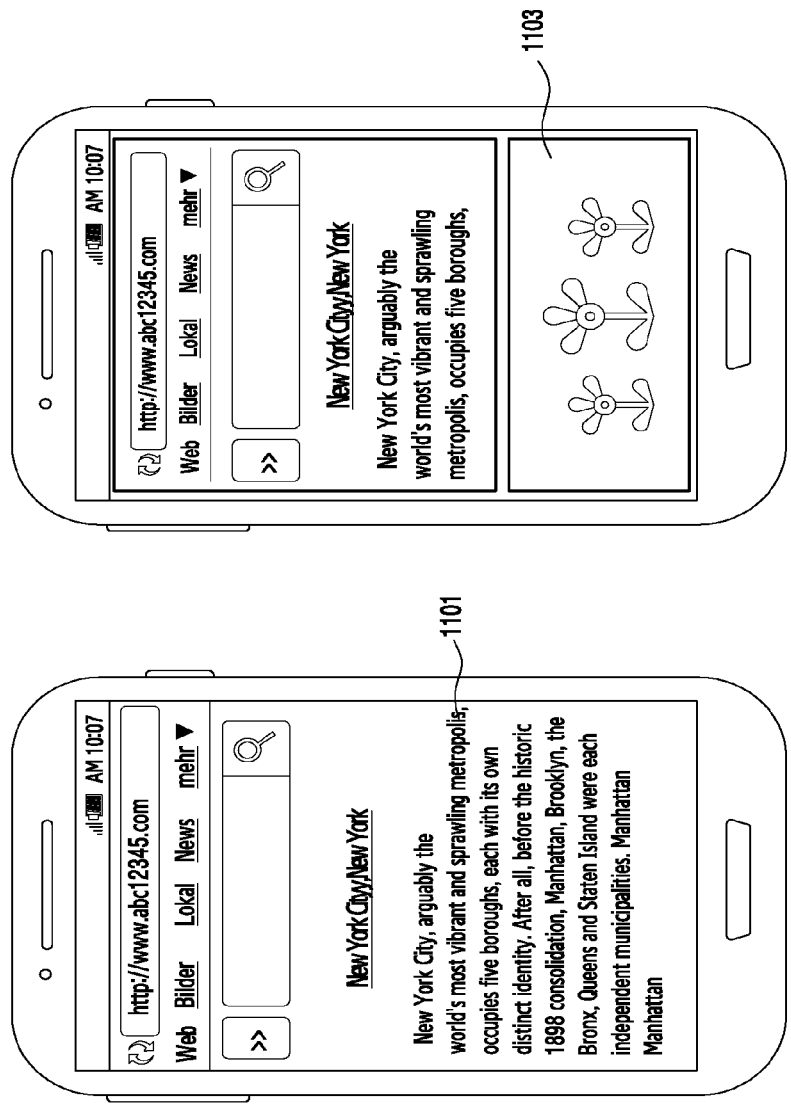

[Fig. 12]
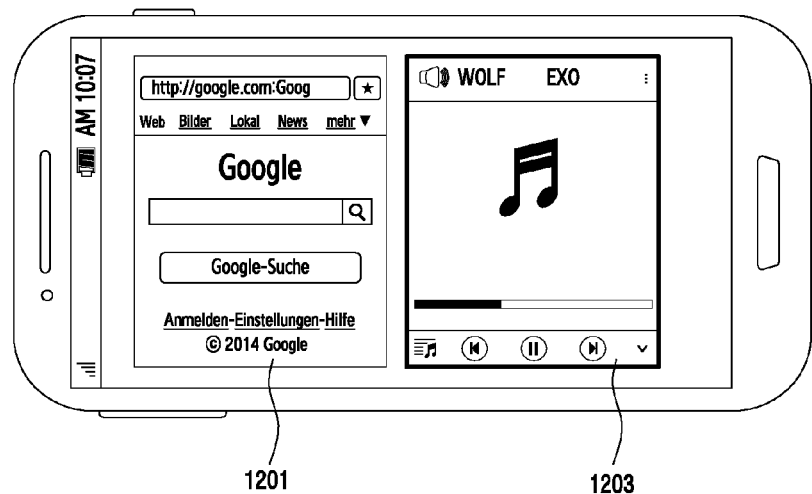
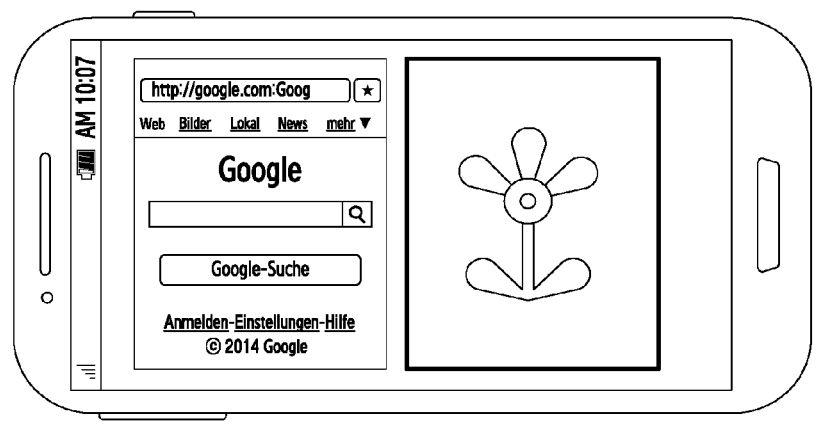

[Fig. 13a]
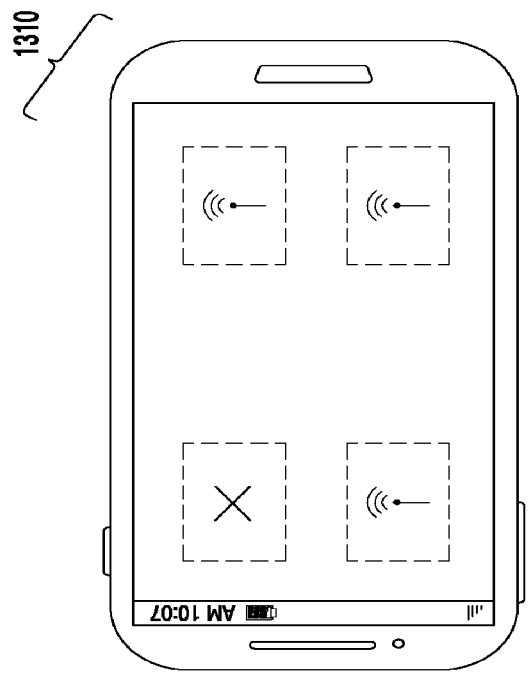
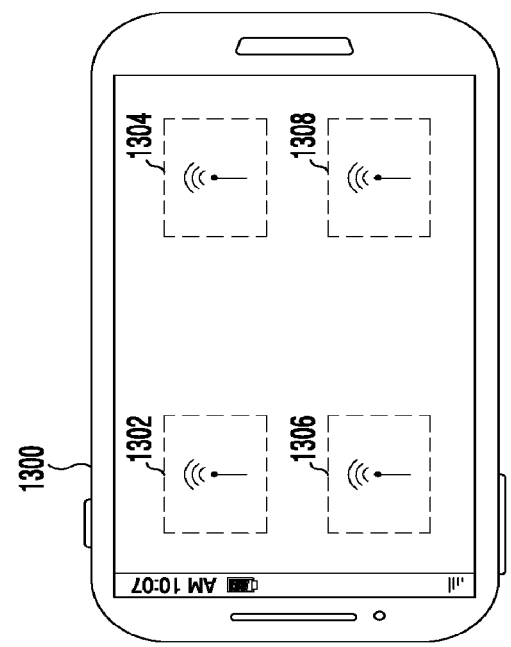

[Fig. 13b]
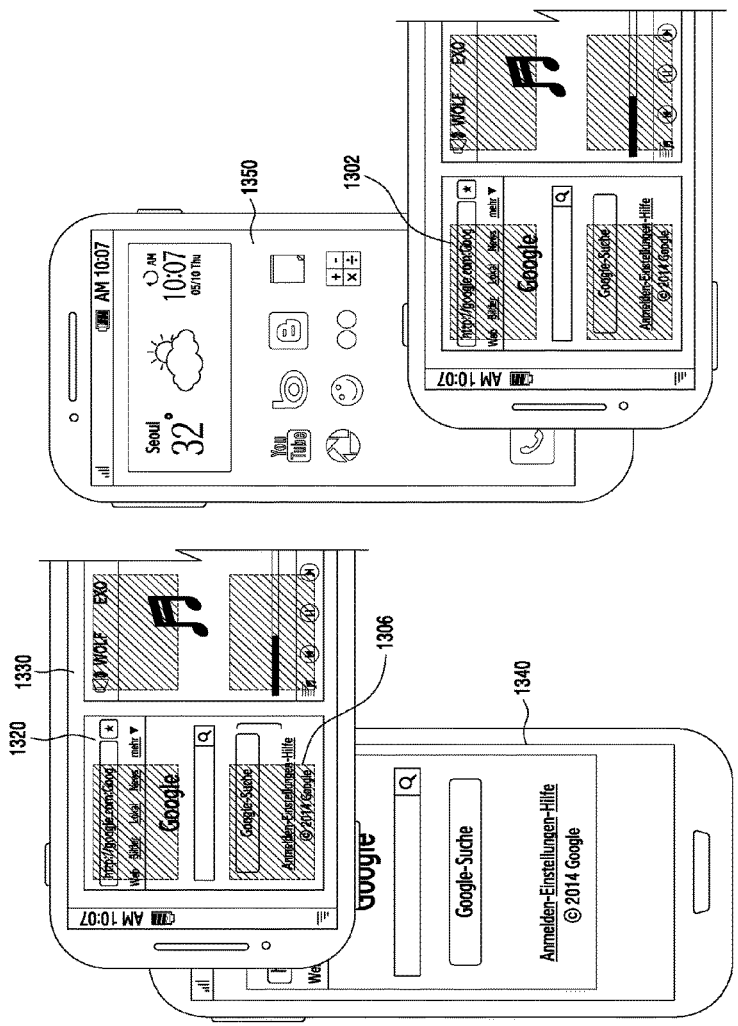
[Fig. 14a]
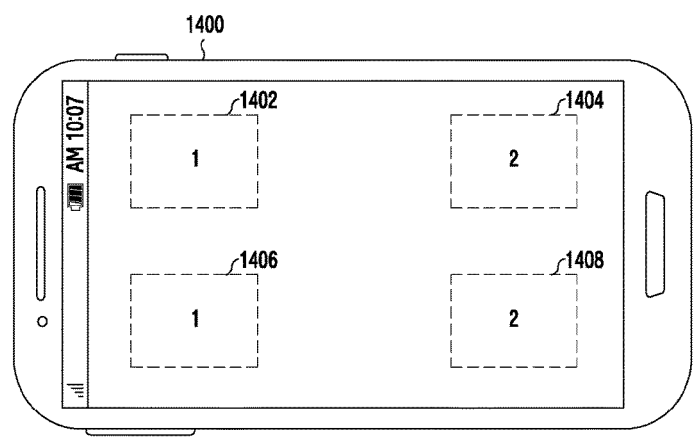

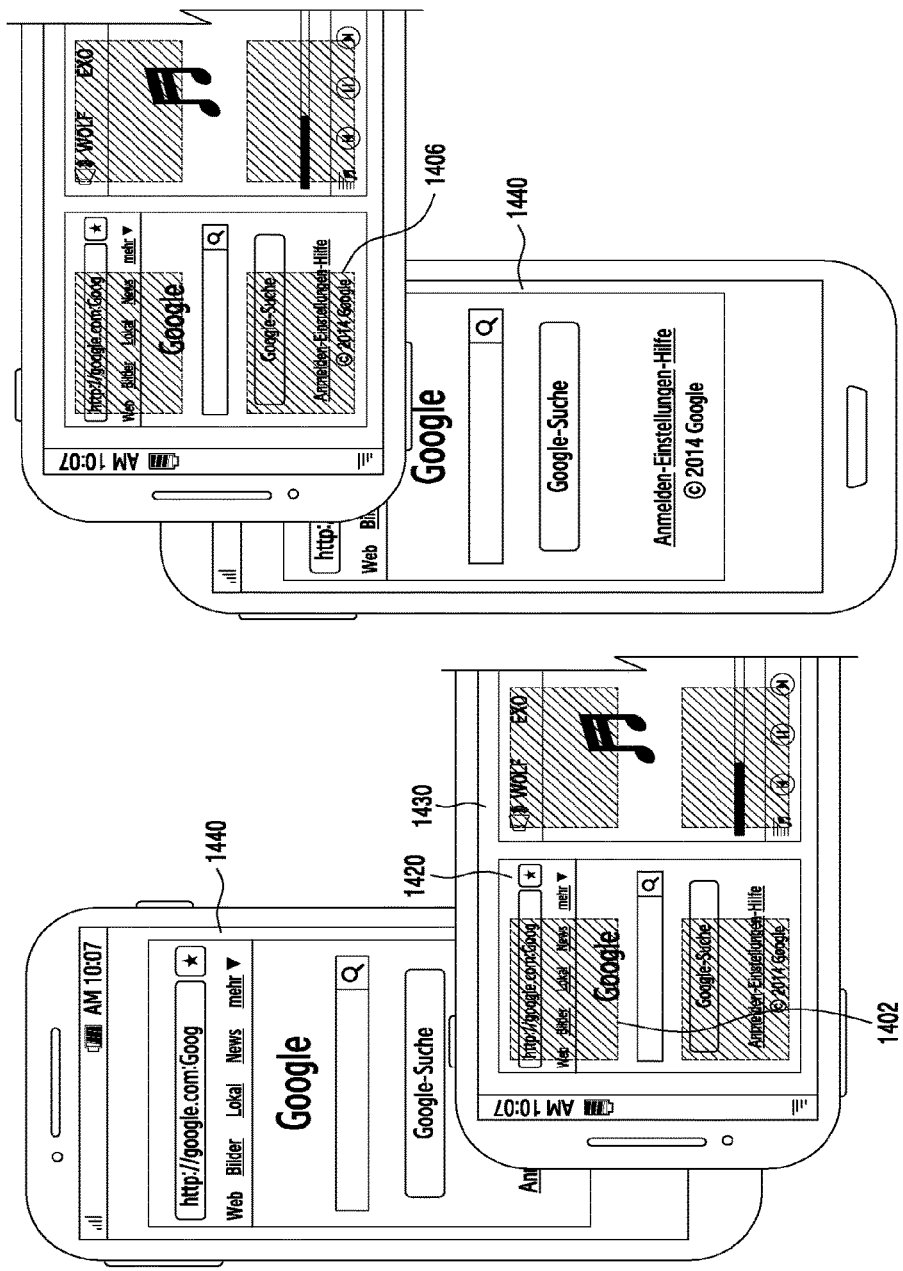
[Fig. 14b]

METHOD FOR CONTROLLING AND ELECTRONIC DEVICE THEREOF

PRIORITY

This application is a National Phase Entry of PCT International Application No. PCT/KR2015/013017, which was filed on Dec. 2, 2015, and claims priority to Korean Patent Application No. 10-2014-0177702, which was filed on Dec. 10, 2014, the contents of each of which are incorporated herein by reference.

TECHNICAL FIELD

Various exemplary embodiments relate to a method for sharing data and outputting the shared data and an electronic device thereof.

BACKGROUND ART

With the recent rapid growth of electronic devices, electronic devices making wireless voice call and information exchange possible became the necessities of life. In the beginning of spreading of the electronic devices, they were simply recognized to be portable and make wireless call possible. However, with the growth of technologies of the electronic devices and the introduction of wireless Internet, the electronic devices are satisfying users' desires since the electronic devices are more increasing in use scope such as playing a game, remote control using short-range communication, and photographing images by installed digital cameras, as well as the purposes of simple telephony or schedule management, etc.

Further, the electronic device can establish a network with peripheral devices. Due to this, the electronic device can also share data with the peripheral devices connected over the network. Generally, the electronic device may use short-range communication for the sake of data sharing. For example, the electronic device may use Wireless Fidelity (WiFi), Near Field Communication (NFC), Bluetooth (BT), etc. to form a communication with the peripheral devices.

DISCLOSURE OF INVENTION

Solution to Problem

Generally, the electronic device may share data defined for sharing, in response to sensing the proximity of a peripheral device which desires to share the data.

Further, the electronic device may execute a sharing application to transmit sharing data to a peripheral device and output shared data received from the peripheral device.

Generally, the data sharing of the electronic device is simply to share predefined data by a predefined operation. The kind of sharing data may be defined restrictively. The sharing application ends a previously executed application and/or changes the outputting of a screen of the previously executed application, thereby restricting the provision of information to a user.

According to various exemplary embodiments, the electronic device may provide an apparatus and method for sharing various kinds of data.

According to various exemplary embodiments, the electronic device may provide an apparatus and method for sharing different data based on the approaching direction of a peripheral device.

According to various exemplary embodiments, the electronic device may provide an apparatus and method for determining an output region of sharing data based on the approaching direction of a peripheral device.

According to various exemplary embodiments, an electronic device may include a communication module for forming a communication link with a second electronic device, and a control module configured to perform a sharing operation based on at least one of a setting state of an execution screen of the electronic device and the communication module sensing the proximity of the second electronic device, in response to the searching of the second electronic device.

According to various exemplary embodiments, an operation method of an electronic device may include the operations of sensing the proximity of a second electronic device, in response to the proximity of the second electronic device, acquiring information associated with at least one of a proximity position of the second electronic device and a setting state of an execution screen of the electronic device, and determining sharing data based on the acquired information.

According to various exemplary embodiments, an electronic device may include a display, a first communication module for sensing the proximity of a second electronic device, and a control module configured to control the exchange of sharing data based on at least one of a setting state of a screen outputted to the display and a position of the first communication module sensing the proximity of the second electronic device, in response to the searching of the second electronic device.

According to various exemplary embodiments, an electronic device may include a display for outputting first content and second content and a processor operatively connected with the display. The processor may be set to output the first content through a first region of the display and output the second content through a second region of the display, and share at least one of the first content or the second content with an external device such that the at least one may be displayed through the external device, based on the proximity of the external device to the electronic device.

According to various exemplary embodiments, an electronic device may include a first communication module formed in a first region of the electronic device, a second communication module formed in a second region of the electronic device, and a processor operatively connected with the first communication module and the second communication module. The processor may be set to share data being set to the first communication module with the external device if the external device approaches the first communication module, and share data being set to the second communication module with the external device if the external approaches the second communication module.

BRIEF DESCRIPTION OF DRAWINGS

The above and other objects, features and advantages of the present invention will become more apparent from the following detailed description when taken in conjunction with the accompanying drawings in which:

FIG. 1A is a block diagram illustrating an electronic device within a network environment according to various exemplary embodiments;

FIG. 1B is a diagram illustrating a construction of a processor according to various exemplary embodiments;

FIG. 1C is a diagram illustrating a construction of a communication module according to various exemplary embodiments;

FIG. 1D is a diagram illustrating a construction of a communication module according to various exemplary embodiments;

FIG. 2 is a block diagram illustrating an electronic device according to various exemplary embodiments;

FIG. 3 is a block diagram illustrating a program module according to various exemplary embodiments;

FIG. 4 is a flowchart illustrating a data sharing operation of an electronic device according to various exemplary embodiments;

FIG. 5 is a flowchart illustrating a data sharing operation of an electronic device according to various exemplary embodiments;

FIG. 6A to FIG. 6B are diagrams illustrating a data sharing operation of an electronic device according to various exemplary embodiments;

FIG. 7A to FIG. 7C are diagrams illustrating a data sharing operation of an electronic device according to various exemplary embodiments;

FIG. 8A to FIG. 8C illustrate a data sharing operation of an electronic device according to various exemplary embodiments;

FIG. 9 is a flowchart illustrating a data output operation of an electronic device according to various exemplary embodiments;

FIG. 10 is a diagram illustrating a data output operation of an electronic device according to various exemplary embodiments;

FIG. 11 is a diagram illustrating a data output operation of an electronic device according to various exemplary embodiments;

FIG. 12 is a diagram illustrating a data output operation of an electronic device according to various exemplary embodiments;

FIG. 13A to FIG. 13B are diagrams illustrating a data output operation of an electronic device according to various exemplary embodiments; and FIG. 14A to FIG. 14B are diagrams illustrating a data output operation of an electronic device according to various exemplary embodiments.

BEST MODE FOR CARRYING OUT THE INVENTION

Hereinafter, the present disclosure is described with reference to the accompanying drawings. The present disclosure may be changed variously and have various embodiments, and specific embodiments are exemplarily described and related detailed descriptions are made in the present specification. However, it should be understood that the various embodiments of the present disclosure are not limited to a specific embodied form and include all modifications and/or equivalents or substitutions that fall within the spirit and technical scope of the present disclosure. In the drawing, like reference numerals are used for like elements.

Expressions such as "include" or "may include", etc. that may be used for the present disclosure indicate existence of a disclosed relevant function, operation, or element, etc., and do not limit additional one or more functions, operations, or elements, etc. Also, it should be understood that terminologies such as "include" or "have", etc. in the present disclosure are intended for designating existence of a characteristic, a number, a step, an operation, an element, a part, or a combination of these described on the specification and do not exclude in advance existence or addition possibility of one or more other characteristics, numbers, steps, operations, elements, parts, or a combination of these.

Conjunctions such as "or", etc. in the present disclosure includes a certain and all combinations of words listed together. For example, "A or B" may include A and may include B, or include both A and B.

In the present disclosure, expressions such as "1st", "2nd", "first" or "second", etc. may modify various elements of the present disclosure but do not limit relevant elements. For example, the expressions do not limit sequence and/or importance, etc. of relevant elements. The expressions may be used for discriminating one element from another element. For example, both a first user apparatus and a second user apparatus are all user apparatuses, and represent different user apparatuses. For example, a first element may be named as a second element without departing from the scope of the present disclosure, and similarly, the second element may be named as the first element.

When it is mentioned that a certain element is "connected to" or "accesses" another element, it should be understood that the element may be directly connected to another element or may directly access another element, but still another element may exist in the middle. In contrast, when it is mentioned that a certain element is "directly connected to" or "directly accesses" another element, it should be understood that still another element does not exist in the middle.

A terminology used in the present disclosure is used for explaining only a specific embodiment and is not intended for limiting the present disclosure. Unless clearly expressed otherwise, expression of the singular includes expression of the plural.

Unless defined differently, all terminologies used herein including technological or scientific terminologies have the same meaning as that generally understood by a person of ordinary skill in the art to which the present disclosure belongs. It should be understood that generally used terminologies defined by a dictionary have meaning coinciding with meaning on context of a related technology, and unless clearly defined in the present disclosure, they are not understood as an ideal or excessively formal meaning.

An electronic device according to the present disclosure may be a device including a communication function. For example, an electronic device may include at least one of a smartphone, a tablet personal computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, or a wearable device (e.g., a head-mounted-device (HMD) such as electronic glasses, an electronic clothing, an electronic bracelet, an electronic necklace, an electronic appcessory, an electronic tattoo, or a smartwatch).

According to certain embodiments, an electronic device may be a smart home appliance having a communication function. A smart home appliance may include, for example, at least one of a television, a Digital Video Disk (DVD) player, an audio, a refrigerator, an air conditioner, a cleaner, an oven, an electronic range, a washing machine, an air purifier, a set-top box, a TV box (e.g., Samsung HomeSync™, Apple TV™, or Google TV™), game consoles, an electronic dictionary, an electronic key, a camcorder, or an electronic frame.

According to certain embodiments, an electronic device may include at least one of various medical devices (e.g., Magnetic Resonance Angiography (MRA), Magnetic Resonance Imaging (MRI), Computed Tomography (CT), a shooting device, an ultrasonic device, etc.), a navigation device, a Global Positioning System (GPS) receiver, an event data recorder (EDR), a flight data recorder (FDR), an automobile infotainment device, electronic equipment for a ship (e.g., a navigation device for a ship, a gyro compass, etc.), avionics, a security device, or a robot for an industrial use or a home use.

According to certain embodiments, an electronic device may include at least one of a furniture or a portion of a building/structure including a communication function, an electronic board, an electronic signature receiving device, a projector, or various measurement devices (e.g., waterworks, electricity, gas, or radio wave measuring device, etc.). An electronic device according to the present disclosure may be a combination of one or more of the above-described devices. Also, it is obvious to a person of ordinary skill in the art that the electronic device according to the present disclosure is not limited to the above-described devices.

Hereinafter, an electronic device according to various embodiments of the present disclosure is described with reference to the accompanying drawings. A terminology of a user used in various embodiments may indicate a person who uses an electronic device or a device (e.g., artificial intelligence electronic device) that uses the electronic device.

Referring to FIG. 1A, an electronic device 101 within a network environment 100 according to various exemplary embodiments is mentioned. The electronic device 101 may include a bus 110, a processor 120, a memory 130, an input/output interface 150, a display 160, a communication interface 170, and an image processing module 180. In some exemplary embodiments, the electronic device 101 may omit at least one of the constituent elements or additionally have other constituent elements.

The bus 110 may be, for example, a circuit connecting the constituent elements 110 to 180 with one another and forwarding communication (e.g., a control message and/or data) among the constituent elements.

The processor 120 may include one or more of a Central Processing Unit (CPU), an Application Processor (AP), or a Communication Processor (CP). The processor 120 may, for example, execute operation or data about control and/or communication of at least one other constituent element of the electronic device 101.

The memory 130 may include a volatile and/or nonvolatile memory. The memory 130 may, for example, store an instruction or data related to at least one other constituent element of the electronic device 101. According to various exemplary embodiments, the memory 130 may store a software and/or program 140. The program 140 may, for example, include a kernel 141, a middleware 143, an Application Programming Interface (API) 145, and/or an application program (or application) 147, etc. At least some of the kernel 141, the middleware 143, or the API 145 may be denoted as Operating Systems (OS).

The kernel 141 may control or manage system resources (e.g., the bus 110, the processor 120, or the memory 130, etc.) used to execute operations or functions implemented in the other programs (e.g., the middleware 143, the API 145, or the application program 147). Also, the kernel 141 may provide an interface of enabling the middleware 143, the API 145, or the application program 147 to access the individual constituent element of the electronic device 101, thereby controlling or managing the system resources.

The middleware 143 may, for example, perform a relay role of enabling the API 145 or the application program 147 to communicate and exchange data with the kernel 141.

Also, the middleware 143 may process one or more work requests received from the application program 147 in accordance with priority order. For example, the middleware 143 may grant the priority order capable of using the system resources (e.g., the bus 110, the processor 120, or the memory 130, etc.) of the electronic device 101 to at least one of the application program 147. For instance, the middleware 143 may process the one or more work requests in accordance with the priority order granted to the at least one of the application program 147, thereby performing scheduling or load balancing for the one or more work requests.

The API 145 is an interface of enabling the application 147 to control a function provided by the kernel 141 or the middleware 143. The API 145 may, for example, include at least one interface or function (e.g., instruction) for file control, window control, image processing, or character control, etc.

The input/output interface 150 may play a role of forwarding an instruction or data inputted from a user or other external electronic devices to other constituent element(s) of the electronic device 101. Also, the input/output interface 150 may output an instruction or data received from the other constituent element(s) of the electronic device 101, to the user or other external electronic devices.

The display 160 may, for example, include a Liquid Crystal Display (LCD), a Light-Emitting Diode (LED) display, an Organic Light-Emitting Diode (OLED) display, or a MicroElectroMechanical Systems (MEMS) display, or an electronic paper display. The display 160 may, for example, display various contents (e.g., a text, an image, a video, an icon, or a symbol, etc.) to a user. The display 160 may include a touch screen, and may, for example, receive a touch, a gesture, proximity, or hovering input using a part of an electronic pencil or a user's human body.

The communication interface 170 may, for example, establish communication between the electronic device 101 and the external electronic device (e.g., a first external electronic device 102, a second external electronic device 104, or a server 106). For example, the communication interface 170 may be connected to a network 162 through wireless communication or wired communication, and communicate with the external electronic device (e.g., the second external electronic device 104 or the server 106).

The wireless communication may, for example, use at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM)), as a cellular communication protocol. Also, the wireless communication may, for example, include a short-range communication 164. The short-range communication 164 may, for example, include at least one of Wireless Fidelity (WiFi), Bluetooth (BT), Near Field Communication (NFC), Global Positioning System (GPS). The wired communication may, for example, include at least one of a Universal Serial Bus (USB), a High Definition Multimedia Interface (HDMI), a Recommended Standard-232 (RS-232), or a Plain Old Telephone Service (POTS), etc. The network 162 may include a telecommunications network, for example, at least one of a computer network (e.g., a Local Area Network (LAN) or a Wide Area Network (WAN)), the Internet, or a telephone network.

The image processing module 180 may acquire and process at least one image from the electronic device 101 or the external electronic device (e.g., the first external electronic device 102, the second external electronic device 104, or the server 106). For example, the image processing module 180 may associate the acquired images with one another or generate image data including at least a part of the acquired images.

In FIG. 1A, the image processing module 180 is shown as a construction independent from the processor 120 and the memory 130, but various exemplary embodiments are not limited to this. The image processing module 180 may be, for example, implemented to be integrated with the processor 120, and may be implemented in such a manner that it can be stored in the memory 130 in a software form and be executed in the processor 120. Also, the image processing module 130 may be, for example, dispersed and implemented in the processor 120 and the memory 130. Supplemental information about the image processing module 180 is provided in relation with FIG. 4 to FIG. 14B.

The first and second external electronic devices 102 and 104 each may be a device of the same or different kind as that of the electronic device 101. According to various exemplary embodiments, the server 106 may include a group of one or more servers. According to various exemplary embodiments, all or some of operations executed in the electronic device 101 may be executed in different one or multiple electronic devices (e.g., the electronic devices 102 and 104 or the server 106). According to various exemplary embodiments, in case that the electronic device 101 has to perform any function or service automatically or by a request, the electronic device 101 may send, instead of or additionally to executing the function or service in itself, a request for at least a partial function associated with this function or service to the other electronic devices (e.g., the electronic devices 102 and 104 or the server 106). The other electronic devices (e.g., the electronic devices 102 and 104 or the server 106) may execute the requested function or a supplemental function, and forward the execution result to the electronic device 101. The electronic device 101 may process the received execution result as it is or additionally, thereby providing the requested function or service. For this, for example, a cloud computing, dispersed computing, or client-server computing technology may be used.

FIG. 1B is a diagram illustrating a construction of a processor according to various exemplary embodiments.

According to various exemplary embodiments, the processor may be a construction of an electronic device (for example, the electronic device 101 of FIG. 1A) or a peripheral device (for example, the external electronic device 102 or 104 of FIG. 1A). According to various exemplary embodiments, the electronic device may operate as a tag. The electronic device may communicate with a peripheral device operating as a reader for data sharing. According to various exemplary embodiments, the electronic device may operate as the reader. The electronic device also communicate with a peripheral device operating as the tag for data sharing.

According to various exemplary embodiments, the processor may include a communication module 182, a determination module 184, and a control module 186.

The communication module 182 may be configured to support a wireless communication interface. According to various exemplary embodiments, the communication module 182 may include a wireless communication module supporting short-range communication with a peripheral device. According to various exemplary embodiments, the communication module 182 may support various short-range communication schemes, for example, Bluetooth Low Energy (BLE), Bluetooth (BT), Infrared Data Association (IrDA), Near Field Communication (NFC), Radio Frequency IDentification (RFID), Wireless Fidelity (WiFi), etc. According to various exemplary embodiments, the communication module 182 may include one wireless communication module or a plurality of wireless communication modules. The plurality of wireless communication modules are arranged in different positions and thus, operations of the wireless communication modules may be associated with the positions.

According to various exemplary embodiments, the communication module 182 may form a link with a peripheral device in response to determination of the proximity of the peripheral device, and may transmit predetermined data to the linked peripheral device or receive predetermined data from the linked peripheral device. According to one exemplary embodiment, if the communication module 182 is implemented in an NFC scheme, the communication module 182 may be activated by tagging with the peripheral device or by proximity recognized to be the tagging and thus, perform a predetermined authentication operation with the peripheral device. According to one exemplary embodiment, the authentication operation, which is an operation for checking communication possibility, may be an operation of sending a message (for example, a ping message, etc.) of checking communication or non-communication and receiving a response to this.

According to various exemplary embodiments, the communication module 182 may include a first communication module and a second communication module in accordance with a short-range communication scheme. Here, the first communication module may be associated with sensing the proximity of a peripheral device, and the second communication module may be associated with sharing data. According to one exemplary embodiment, the first communication module may support one communication scheme among a BLE scheme, a Bluetooth scheme, and an NFC scheme, and the second communication module may support a WiFi scheme. According to another exemplary embodiment, at least one communication module among the first communication module and the second communication module may maintain a sleep state, and the remaining communication module may maintain a wake-up state. For example, the first communication module may operate in the BLE scheme and check the proximity of a peripheral device and, according to the proximity of the peripheral device, the second communication module may wake up and transmit data to the peripheral device.

The determination module 184 may sense the proximity of a peripheral device based on a radio signal transmitted by the peripheral device. For example, by sensing a radio signal including a message of checking communication or non-communication through the communication module 182, the determination module 184 may sense the proximity of the peripheral device.

According to various exemplary embodiments, the determination module 184 may check data to be shared with a peripheral device in response to sensing the proximity of the peripheral device. The data to be shared may be predefined. According to various exemplary embodiments, the determination module 184 may check data to be shared based on a proximity position of the peripheral device.

For example, the determination module 184 may check, as sharing data, data associated with a position corresponding to a wireless communication module sensing the proximity of a peripheral device. According to various exemplary embodiments, the position corresponding to the wireless communication module sensing the proximity of the peripheral device may be associated with at least one of up, down, left, right, front, and rear surfaces of the electronic device. For example, in a state in which first data associated with a first position, second data associated with a second position, third data associated with a third position, and fourth data associated with a fourth position are sharable, if sensing a peripheral device approaching the first position, the determination module 184 may determine that the first data associated with the first position is sharable with the peripheral device.

For another example, the determination module 184 may associate a proximity position of a peripheral device with an output screen of the electronic device. For example, in a state in which first data associated with a first screen, second data associated with a second screen, and third data associated with a third screen are sharable, if sensing a peripheral device approaching the first screen, the determination module 184 may determine that the first data associated with the first screen is sharable with the peripheral device.

According to various exemplary embodiments, at peripheral device's approaching, the determination module 184 may check data to be shared based on setting of an output screen of the electronic device. For example, at a data sharing time point, the determination module 184 may check, as sharing data, data associated with a screen which is set as a main screen among outputted at least one screen of the electronic device. According to one exemplary embodiment, the main screen may be defined by a user input. For example, in a state in which a plurality of screens including the main screen are outputted from the electronic device, the determination module 184 may determine, as sharing data, data associated with the main screen. In an example, in a state in which a second screen of the electronic device is set as the main screen of the electronic device, although sensing a peripheral device approaching a first screen or third screen of the electronic device, the determination module 184 may determine that second data associated with the second screen of the electronic device is sharable.

According to various exemplary embodiments, the determination module 184 may check an output scheme for data to be shared in response to sensing the proximity of a peripheral device. According to various exemplary embodiments, the output scheme for the data may be associated with a position of an output screen of shared data.

According to various exemplary embodiments, the determination module 184 may check a data output scheme based on a proximity position of a peripheral device. For example, the determination module 184 may check, as a data output position, a position associated with a position corresponding to a wireless communication module sensing the proximity of the peripheral device. In an example, in a state in which a first output position associated with a position of a first wireless communication module, a second output position associated with a position of a second wireless communication module, a third output position associated with a position of a third wireless communication module, and a fourth output position associated with a position of a fourth wireless communication module are defined, if sensing a peripheral device approaching the position of the first wireless communication module, the determination module 184 may determine that it outputs data shared with the peripheral device, to the first output position associated with the position of the first wireless communication module. For another example, the determination module 184 may associate a proximity position of the peripheral device with an output screen of the electronic device. In an example, in a state in which a first output position associated with a first screen, a second output position associated with a second screen, and a third output position associated with a third screen are defined, if sensing a peripheral device approaching the first screen, the determination module 184 may determine that it outputs data shared with the peripheral device, to the first output position associated with the first screen.

According to various exemplary embodiments, at peripheral device's approaching, the determination module 184 may check a data output scheme based on setting of an output screen of the electronic device. For example, at a data sharing time point, the determination module 184 may check, as a data output position, a position associated with a screen which is set as a main screen among outputted screens of the electronic device. In an example, in a state in which a plurality of screens including the main screen are outputted from the electronic device, if sensing the proximity of a peripheral device, the determination module 184 may determine that it outputs share data to an output position associated with the main screen of the electronic device. For example, in a state in which a second screen of the electronic device is set as the main screen of the electronic device, although sensing a peripheral device approaching a first screen or third screen of the electronic device, the determination module 184 may determine that it outputs share data to a second output position associated with the second screen having been set as the main screen.

In contrast, according to one exemplary embodiment, the determination module 184 may define another screen excepting a main screen as an output position of shared data. For example, in a state in which a plurality of screens including the main screen are outputted from the electronic device, if sensing the proximity of a peripheral device, the determination module 184 may determine that it outputs shared data to one screen among the remaining screens excepting the main screen.

According to various exemplary embodiments, the determination module 184 may determine a proximity position of a peripheral device based on a position of a communication module sensing the proximity of the peripheral device.

According to various exemplary embodiments, if sensing the proximity of a plurality of peripheral devices, the determination module 184 may determine a data output position and data associated with a peripheral device satisfying a condition. For example, the condition may be associated with a strength of a received signal and, in this case, the determination module 184 may select a peripheral device associated with the highest strength of the received signal as a peripheral device for data sharing. For another example, the condition may be associated with a preference and, in this case, the determination module 184 may select a peripheral device corresponding to a predefined preference as a peripheral device for data sharing.

According to various exemplary embodiments, if sensing the proximity of a peripheral device through a plurality of communication modules, the determination module 184 may determine a data output position and sharing data based on a communication module sensing a peripheral device satisfying a condition. For example, if sensing one peripheral device through two communication modules, the determination module 184 may determine a data output position and sharing data associated with a communication module being in proximity with the peripheral device. For example, the determination module 184 may select a communication module sensing a peripheral device based on a strength of a received signal.

The control module 186 may process to perform a predetermined operation in response to the proximity of a peripheral device. According to one exemplary embodiment, the predetermined operation may be associated with an operation of transmitting sharing data, an operation of outputting shared data, etc.

According to various exemplary embodiments, the control module 186 may transmit data determined by the determination module 184 to a peripheral device in response to the proximity of the peripheral device.

According to various exemplary embodiments, the control module 186 may output shared data based on an output scheme determined by the determination module 184 in response to the proximity of a peripheral device.

FIG. 1C is a diagram illustrating a construction of a communication module according to various exemplary embodiments.

According to various exemplary embodiments, the electronic device 101 may sense the proximity of a peripheral device to various directions. According to various exemplary embodiments, the electronic device 101 may arrange a communication module corresponding to each direction and sense the proximity of a peripheral device.

For example, the electronic device 101 may have a first communication module for sensing the proximity of a peripheral device to a first direction and a second communication module for sensing the proximity of the peripheral device to a second direction.

According to various exemplary embodiments, the communication module may include an antenna radiator 194 and a radiation cutoff unit 192. According to one exemplary embodiment, the radiation cutoff unit 192 may be a ferrite for controlling antenna radiation in a specific direction, a bracket (for example, a magnesium bracket) for cutting off the antenna radiation, etc.

For example, as illustrated in FIG. 1C, the first communication module may position the antenna radiator 194 in a first direction and arrange the radiation cutoff unit 192 in a rear surface of the antenna radiator 194 such that a signal may be radiated in the first direction only. Further, as illustrated in FIG. 1C, the second communication module may position the antenna radiator 194 in a second direction and arrange the radiation cutoff unit 192 in a rear surface of the antenna radiator 194 such that a signal may be radiated in the second direction only.

FIG. 1D is a diagram illustrating a construction of a communication module according to various exemplary embodiments.

According to various exemplary embodiments, the electronic device 101 may sense the proximity of a peripheral device to various directions. According to various exemplary embodiments, the electronic device 101 may arrange a single communication module to sense the proximity of the peripheral device to a plurality of directions.

According to various exemplary embodiments, the communication module may arrange a radiation cutoff unit 192 between antenna radiators 194.

For example, as illustrated in FIG. 1D, the communication module may arrange a radiation cutoff unit 192 between a first antenna radiator 194 and a second antenna radiator 194, and process to radiate a signal of the first antenna radiator 194 in a first direction by means of the radiation cutoff unit 192 and process to radiate a signal of the second antenna radiator 194 in a second direction by means of the radiation cutoff unit 192.

According to various exemplary embodiments, one electrically connected antenna radiator 194 may be provided. At this time, the one electrically connected antenna radiator 194 may perform the roles of the first antenna radiator 194 and the second antenna radiator 194 by means of the radiation cutoff unit 192.

For another example, as illustrated in FIG. 1D, the communication module may arrange the radiation cutoff unit 192 adjacently to at least partial region of the antenna radiator 194 and process to radiate a signal of the antenna radiator 194 in a plurality of directions by means of the radiation cutoff unit 192. In an example, in case that the antenna radiator 194 is arranged in a partial region of an edge of the radiation cutoff unit 192, for example, the communication module may process to radiate a signal of the antenna radiator 194 in a first direction and a second direction. Here, the first direction and the second direction may be various directions parallel or vertical with the antenna radiator 194.

According to various exemplary embodiments, the communication module may be arranged inside of the electronic device or outside of the electronic device. According to various exemplary embodiments, the outside of the electronic device may include a cover of the electronic device, a battery cover, a protection cover of the electronic device, etc.

FIG. 2 is a block diagram of an example of an electronic device 201, according to various embodiments of the present disclosure. The electronic device 201 may configure, for example, all or a portion of the electronic device 101 illustrated in FIG. 1. Referring to FIG. 2, the electronic device 201 may include one or more application processors (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, or a motor 298.

The AP 210 may drive an OS or an application to control a plurality of hardware or software elements connected to the AP 210, and perform various data processes including multimedia data and operations. The AP 210 may be implemented, for example, as a system on chip (SoC). According to an embodiment, the AP 210 may further include a graphic processing unit (GPU) (not shown).

The communication module 220 (e.g., the communication interface 170) may perform data transmission/reception in communication between the electronic device 201 (e.g., the electronic device 101) and other electronic devices (e.g., the electronic device 102, 104 or the server 106) connected via a network. According to an embodiment, the communication module 220 may include a cellular module 221, a Wi-Fi module 223, a BT module 225, a GPS module 227, an NFC module 228, and a Radio Frequency (RF) module 229.

The cellular module 221 may provide voice communication, image communication, a short message service, or an Internet service, etc. via a communication network (e.g., LTE, LTE-A, CDMA, WCDMA, UMTS, WiBro, or GSM, etc.). Also, the cellular module 221 may perform discrimination and authentication of an electronic device within a communication network using, for example, a subscriber identity module (e.g., a SIM card 224). According to an embodiment, the cellular module 221 may perform at least a portion of functions that may be provided by the AP 210.

For example, the cellular module 221 may perform at least a portion of a multimedia control function.

According to an embodiment, the cellular module 221 may include a communication processor (CP). Also, the cellular module 221 may be, for example, implemented as a SoC. Though elements such as the cellular module 221 (e.g., a communication processor), the memory 230, or the power management module 295, etc. are illustrated as elements separated from the AP 210 in FIG. 2, according to an embodiment, the AP 210 may be implemented to include at least a portion (e.g., the cellular module 221) of the above-described elements.

According to an embodiment, the AP 210 or the cellular module 221 (e.g., a communication processor) may load an instruction or data received from at least one of a non-volatile memory and other elements connected thereto onto a volatile memory, and process the same. Also, the AP 210 or the cellular module 221 may store data received from at least one of other elements or generated by at least one of other elements in a non-volatile memory.

Each of the Wi-Fi module 223, the BT module 225, the GPS module 227, or the NFC module 228 may include, for example, a processor for processing data transmitted/received via a relevant module. Though the cellular module 221, the Wi-Fi module 223, the BT module 225, the GPS module 227, or the NFC module 228 are illustrated as separate blocks in FIG. 2, according to an embodiment, at least a portion (e.g., two or more elements) of the cellular module 221, the Wi-Fi module 223, the BT module 225, the GPS module 227, or the NFC module 228 may be included in one Integrated Circuit (IC) or an IC package. For example, at least a portion (e.g., a communication processor corresponding to the cellular module 221 and a Wi-Fi processor corresponding to the Wi-Fi module 223) of processors corresponding to each of the cellular module 221, the Wi-Fi module 223, the BT module 225, the GPS module 227, or the NFC module 228 may be implemented as one SoC.

The RF module 229 may perform transmission/reception of data, for example, transmission/reception of an RF signal. The RF module 229 may include, for example, a transceiver, a power amp module (PAM), a frequency filter, or a low noise amplifier (LNA), etc., though not shown. Also, the RF module 229 may further include a part for transmitting/receiving an electromagnetic wave on a free space in wireless communication, for example, a conductor or a conducting line, etc. Though FIG. 2 illustrates the cellular module 221, the Wi-Fi module 223, the BT module 225, the GPS module 227, and the NFC module 228 share one RF module 229, according to an embodiment, at least one of the cellular module 221, the Wi-Fi module 223, the BT module 225, the GPS module 227, or the NFC module 228 may perform transmission/reception of an RF signal via a separate RF module.

The SIM card 224 may be a card including a subscriber identify module, and may be inserted into a slot formed in a specific position of the electronic device. The SIM card 224 may include unique identity information (e.g., integrated circuit card identifier (ICCID)) or subscriber information (e.g., international mobile subscriber identity (IMSI)).

The memory 230 (e.g., the memory 130) may include a built-in memory 232 or an external memory 234. The built-in memory 232 may include, for example, at least one of a volatile memory (e.g., dynamic RAM (DRAM), static RAM (SRAM), synchronous dynamic RAM (SDRAM)) and a non-volatile memory (e.g., one-time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment, the built-in memory 232 may be a Solid State Drive (SSD). The external memory 234 may further include a flash drive, for example, compact flash (CF), secure digital (SD), micro secure digital (Micro-SD), mini secure digital (Mini-SD), extreme digital (xD), or a memory stick. The external memory 234 may be functionally connected to the electronic device 201 via various interfaces. According to an embodiment, the electronic device 201 may further include a storage device (or a storage medium) such as a hard drive.

The sensor module 240 may measure a physical quantity or detect an operation state of the electronic device 201, and convert the measured or detected information to an electric signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., RGB (red, green, blue) sensor), a living body sensor 240I, a temperature/humidity sensor 240J, an illuminance sensor 240K, or an ultra violet (UV) sensor 240M. Additionally or alternatively, the sensor module 240 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), etc. The sensor module 240 may further include a control circuit for controlling at least one sensor belonging thereto.

The input unit 250 may include a touch panel 252, a (digital) pen sensor 254, a key 256, or an ultrasonic input unit 258. The touch panel 252 may recognize a touch input using at least one of capacitive, resistive, infrared, or ultrasonic methods. Also, the touch panel 252 may further include a control circuit. A capacitive touch panel may perform detection by a physical contact or proximity recognition. The touch panel 252 may further include a tactile layer. In this case, the touch panel 252 may provide a tactile reaction to a user.

The (digital) pen sensor 254 may be implemented using, for example, a method which is the same as or similar to receiving a user's touch input, or using a separate sheet for detection. The key 256 may include, for example, a physical button, an optical key or keypad. The ultrasonic input unit 258 is a unit for recognizing data by detecting a sound wave using a microphone (e.g., a microphone 288) in the electronic device 201 via an input tool generating an ultrasonic signal, and enables wireless recognition. According to an embodiment, the electronic device 201 may receive a user input from an external device (e.g., a computer or a server) connected to the communication module 220 using the communication module 220.

The display 260 (e.g., the display 150) may include a panel 262, a hologram device 264, or a projector 266. The panel 262 may be, for example, a liquid crystal display (LCD), or an active-matrix organic light-emitting diode (AM-OLED), etc. The panel 262 may be implemented, for example, such that it is flexible, transparent, or wearable. The panel 262 may be configured as one module together with the touch panel 252. The hologram device 264 may show a three-dimensional image in the air using interferences of light. The projector 266 may project light onto a screen to display an image. The screen may be positioned, for example, inside or outside the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may convert a sound and an electric signal in dual directions. At least a partial element of the audio module 280 may be included, for example, in the I/O interface 150 illustrated in FIG. 1. The audio module 280 may process sound information input or output via, for example, a speaker 282, a receiver 284, an earphone 286, or a microphone 288, etc.

The camera module 291 is a device that may shoot a still image and a moving picture. According to an embodiment, the camera module 291 may include one or more image sensors (e.g., a front sensor or a rear sensor), a lens (not shown), an image signal processor (ISP) (not shown), or a flash (not shown) (e.g., an LED or xenon lamp).

The power management module 295 may manage the power supply of the electronic device 201. Though not shown, the power management module 295 may include, for example, a power management integrated circuit (PMIC), a charger integrated circuit (IC), or a battery or a battery or fuel gauge.

The PMIC may be mounted, for example, inside an integrated circuit or a SoC semiconductor. A charging method may be classified into a wired charging method and a wireless charging method. The charging IC may charge a battery and prevent overvoltage or overcurrent from being caused by a charger. According to an embodiment, the charging IC may include a charging IC for at least one of the wired charging method and the wireless charging method. The wireless charging method may be, for example, a magnetic resonance method, a magnetic induction method, or an electromagnetic wave method, etc., and may additionally include an additional circuit for wireless charging, for example, a circuit such as a coil loop, a resonance circuit, or a rectifier, etc.

The battery gauge may measure, for example, a remnant of the battery 296, a voltage, a current, or a temperature while charging. The battery 296 may store or generate electricity, and supply power to the electronic device 201 using the stored or generated electricity. The battery 296 may include, for example, a rechargeable battery or a solar battery.

The indicator 297 may display a specific state of the electronic device 201 or a portion thereof (e.g., the AP 210), for example, a booting state, a message state, or a charging state, etc. The motor 298 may convert an electric signal to mechanical vibration. Though not shown, the electronic device 201 may include a processor (e.g., a GPU) for supporting a mobile TV. The processor for supporting the mobile TV may process media data corresponding to standards, for example, such as digital multimedia broadcasting (DMB), digital video broadcasting (DVB), or a media flow, etc.

FIG. 3 is a block diagram of an example of a program module 310, according to various embodiments of the present disclosure.

According to an embodiment, the program module 310 (for example, the programs 140) may include an Operating System (OS) for controlling resources related to the electronic device (for example, the electronic device 100) and/or various applications (for example, the application programs 147) executed in the operating system. The operating system may be, for example, Android, iOS, Windows, Symbian, Tizen, Bada, or the like.

The programming module 310 may include a kernel 320, middleware 330, an API 360, and/or applications 370. At least some of the program module 310 may be preloaded in the electronic device or downloaded from the server.

The kernel 320 (for example, the kernel 141 of FIG. 1) may include, for example, a system resource manager 331 or a device driver 333. The system resource manager 331 may control, allocate, or collect the system resources. According to an embodiment, the system resource manager 331 may include a process management unit, a memory management unit, or a file system management unit. The device driver 333 may include, for example, a display driver, a camera driver, a Bluetooth driver, a shared-memory driver, a USB driver, a keypad driver, a WiFi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses to add new functions through a programming language while the application 370 is executed. The runtime library 335 may perform input/output management, memory management, or a function for an arithmetic function.

The application manager 341 may manage, for example, a life cycle of at least one of the applications 370. The window manager 342 may manage Graphical User Interface (GUI) resources used by a screen. The multimedia manager 343 may grasp formats required for the reproduction of various media files, and may perform an encoding or decoding of the media file by using a codec suitable for the corresponding format. The resource manager 344 may manage resources such as a source code, a memory, and a storage space of at least one of the applications 370.

The power manager 345 may operate together with a Basic Input/Output System (BIOS) to manage a battery or power and may provide power information required for the operation of the electronic device. The database manager 346 may generate, search for, or change a database to be used by at least one of the applications 370. The package manager 347 may manage the installation or the updating of applications distributed in the form of a package file.

The connectivity manager 348 may manage, for example, Wi-Fi or Bluetooth wireless connection. The notification manager 349 can display or notify of an event such as an arrival message, promise, proximity notification, and the like in such a way that does not disturb a user. The location manager 350 may manage location information of the electronic device. The graphic manager 351 may manage graphic effects to be provided to a user and user interfaces related to the graphic effects. The security manager 352 may provide all security functions required for system security or user authentication. According to an embodiment, when the electronic device (for example, electronic device 100) has a call function, the middleware 330 may further include a telephony manager for managing a voice call function or a video call function of the electronic device.

The middleware 330 may include a middleware module for forming a combination of various functions of the aforementioned components. The middleware 330 may provide modules specialized according to types of operating systems in order to provide differentiated functions. Further, the middleware 330 may dynamically remove some of the existing components or add new components.

The API 360 (for example, the API 145) is, for example, a set of API programming functions, and a different configuration thereof may be provided according to an operating system. For example, Android or iOS may provide one API set per platform, and Tizen may provide two or more API sets per platform.

The applications 370 (for example, the application programs 147) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information).

According to an embodiment, the applications 370 may include an application (hereinafter, referred to as an "information exchange application" for convenience of the description) supporting information exchange between the electronic device (for example, the electronic device 100) and an external electronic device. The information exchange application may include, for example, a notification relay application for transferring predetermined information to an external electronic device or a device management application for managing an external electronic device.

For example, the notification relay application may include a function of transferring, to the external electronic device, notification information generated from other applications of the electronic device 100 (for example, an SMS/MMS application, an e-mail application, a health management application, or an environmental information application). Further, the notification relay application may receive notification information from, for example, a control device and provide the received notification information to the user. The device management application may manage (for example, install, delete, or update), for example, a function for at least a part of the external electronic device communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 370 may include an application (for example, health management application) designated according to attributes of the external electronic device (for example, attributes of the electronic device such as the type of electronic device which corresponds to a mobile medical device). According to an embodiment, the applications 370 may include an application received from the external electronic devices (for example, the server or the electronic device). According to an embodiment, the applications 370 may include a preloaded application or a third party application which can be downloaded from the server. The names of the components of the program module 310 according to the embodiment illustrated in FIG. 3 may vary according to the type of operating system.

According to various embodiments, at least some of the programming module 310 may be implemented in software, firmware, hardware, or a combination of two or more thereof. At least some of the programming module 310 may be implemented (for example, executed) by, for example, the processor (for example, the application program). At least some of the programming module 310 may include, for example, a module, program, routine, sets of instructions, or process for performing one or more functions.

The term "module" used in the present disclosure may refer to, for example, a unit including a combination of one or more hardware, software, or firmware. The term "module" may be interchangeably used with a term such as "unit," "logic," "logical block," "component," or "circuit," etc. The term "module" may refer to a minimum unit of an integrally configured part or a portion thereof. The term "module" may refer to a minimum unit performing one or more functions or a portion thereof. The term "module" may refer to a device that is mechanically or electronically implemented. For example, a "module" according to the present disclosure may include at least one of an Application-Specific Integrated Circuit (ASIC) chip, a Field-Programmable Gate Array (FPGA), or a programmable-logic device which are known, or will be developed in the future, and performing certain operations.

According to an embodiment of the present disclosure, at least a portion of an apparatus (e.g., modules or functions thereof) or a method (e.g., steps) according to the present disclosure may be implemented as an instruction stored in a non-transitory computer-readable storage media, for example, in the form of a programming module. An instruction, when executed by one or more processors (e.g., the processor 120), may allow the one or more processors to perform a function corresponding to the instruction. The non-transitory computer-readable storage media may be, for example, the memory 130. At least a portion of a programming module may be implemented (e.g., executed) by, for example, the processor 120. At least a portion of the programming module may include, for example, a module, a program, a routine, sets of instructions, or a process, etc. for performing one or more functions.

The non-transitory computer-readable storage media may include a hard disk, a magnetic media such as a floppy disk and a magnetic tape, a Compact Disc Read Only Memory (CD-ROM), optical media such as a Digital Versatile Disc (DVD), magneto-optical media such as a floptical disk, and a hardware device configured for storing and performing a program instruction (e.g., a programming module) such as a Read Only Memory (ROM), a Random Access Memory (RAM), a flash memory, etc. Also, the program instruction may include not only a machine language code generated by a compiler but also a high-level language code executable by a computer using an interpreter, etc. The above-described hardware device may be configured to operate as one or more software modules in order to perform an operation of the present disclosure, and vice versa.

A module or a programming module according to the present disclosure may include at least one of the above-described elements, omit a portion thereof, or further include additional other elements. Operations performed by a module, a programming module, or other elements according to the present disclosure may be executed in a sequential, parallel, or heuristic method. Also, a portion of the operations may be executed in a different sequence, omitted, or other operations may be added.

Also, an embodiment of the present disclosure disclosed in the present disclosure and accompanying drawings merely suggest certain examples so as to easily describe the technological content of the present disclosure and help in the understanding of the present disclosure, and are not intended to limit the scope and spirit of the present disclosure. Accordingly, it should be understood that the scope of the present disclosure includes all modifications or changes drawn on the basis of the technological scope and spirit of the present disclosure, besides the embodiments disclosed herein, as defined by the appended claims and their equivalents.

According to various exemplary embodiments, an electronic device may include a communication module for forming a communication link with a second electronic device, and a control module configured to perform a sharing operation based on at least one of a setting state of an execution screen of the electronic device and the communication module sensing the proximity of the second electronic device, in response to the searching of the second electronic device.

According to various exemplary embodiments, the control module may be configured to determine at least one of sharing data and an output position of the sharing data or an application associated with the sharing data, based on at least one of the communication module sensing the proximity of the second electronic device and the setting state of the execution screen of the electronic device.

According to various exemplary embodiments, the control module may be configured to determine, as sharing data, data associated with at least one of a position of a wireless communication module sensing the proximity of the second electronic device, a screen outputted to the position of the wireless communication module sensing the proximity of the second electronic device, and a main screen of a time point of sensing the proximity of the second electronic device.

According to various exemplary embodiments, the control module may be configured to determine, as the output position, a position associated with at least one of a position of a wireless communication module sensing the proximity of the second electronic device and a position of a main screen of a time point of sensing the proximity of the second electronic device.

According to various exemplary embodiments, the communication module may be configured to be arranged in the inside or outside of the electronic device. According to one exemplary embodiment, the outside of the electronic device may include at least one of a cover of the electronic device, a battery cover, and a protective case of the electronic device.

According to various exemplary embodiments, the control module may be configured to search the second electronic device which approaches in at least one of up, down, left, right, front, and rear directions of the electronic device.

According to various exemplary embodiments, an electronic device may include a display, a first communication module for sensing the proximity of a second electronic device, and a control module configured to control the exchange of sharing data based on at least one of a setting state of a screen outputted to the display and a position of the first communication module sensing the proximity of the second electronic device, in response to the searching of the second electronic device.

According to various exemplary embodiments, the electronic device may include a second communication module for data exchange. According to one exemplary embodiment, the control module may be configured to control the exchange of sharing data with a second electronic device using the second communication module.

According to various exemplary embodiments, the first communication module may consist of at least one or more communication modules.

According to various exemplary embodiments, the first communication module may be configured to be located in a partial region of an output screen outputted to a display device or be located in proximity to the output screen.

According to various exemplary embodiments, the control module may be configured to control the exchange of sharing data associated with a plurality of applications performed with the first communication module.

According to various exemplary embodiments, if the same communication module of a second electronic device is searched from at least two communication modules, the control module may determine sharing data associated with the communication module whose detected signal strength is high.

According to various exemplary embodiments, the control module may control the exchange of sharing data associated with a screen which is set as a main screen or sub screen among a plurality of outputted screens of the electronic device.

According to various exemplary embodiments, the electronic device may include a display for outputting first content and second content and a processor operatively connected with the display. According to one exemplary embodiment, the processor may be set to output the first content through a first region of the display and output the second content through a second region of the display, and share at least one of the first content or the second content with an external device such that the at least one may be displayed through the external device, based on the proximity of the external device to the electronic device.

According to various exemplary embodiments, the processor may be set to share the first content with the external device if the first region of the display is set as a main region of the display, and share the second content with the external device if the second region of the display is set as the main region of the display.

According to various exemplary embodiments, the processor may be set to share the first content with the external device if the external device approaches the first region of the display, and share the second content with the external device if the external device approaches the second region of the display.

According to various exemplary embodiments, the electronic device may further include a first communication module and a second communication module. According to one exemplary embodiment, the first communication module may be formed in a first position corresponding to the first region of the display, and the second communication module may be formed in a second position corresponding to the second region of the display.

According to various exemplary embodiments, the electronic device may include a first communication module formed in the first region of the electronic device, a second communication module formed in the second region of the electronic device, and a processor operatively connected with the first communication module and the second communication module. According to one exemplary embodiment, the processor may be set to share data being set to the first communication module with the external device if the external device approaches the first communication module, and share data being set to the second communication module with the external device if the external approaches the second communication module.

FIG. 4 is a flowchart illustrating a data sharing operation of an electronic device according to various exemplary embodiments.

Referring to FIG. 4, the electronic device may operate as a tag and communicate with a peripheral device operating as a reader for data sharing. According to various exemplary embodiments, the electronic device may also operate as the reader and communicate with a peripheral device operating as the tag for data sharing.

In operation 401, the electronic device may execute a plurality of functions. Here, the function may be associated with an execution screen, and the electronic device may output a plurality of execution screens.

In operation 403, the electronic device may check the proximity of a peripheral device, for example, a second electronic device. According to various exemplary embodiments, the electronic device may select the approaching second electronic device as a data sharing target. According to one exemplary embodiment, the electronic device may check that at least one or more second electronic devices approach. If checking the proximity of a plurality of second electronic devices, the electronic device may select as a data sharing target the second electronic device satisfying a condition among the approaching second electronic devices. According to one exemplary embodiment, the condition may be associated with a strength of a received signal, and the electronic device may select as the data sharing target a second electronic device associated with the highest strength of a received signal. In another example, the condition may be associated with a preference, and the electronic device may select as the data sharing target a second electronic device corresponding to a predefined preference.

In operation 405, the electronic device may check a sharing scheme based on setting of the executed function. For example, checking the sharing scheme may be checking data to be shared. According to one exemplary embodiment, at a data sharing time point, the electronic device may check, as sharing data, data associated with a main function of an outputted screen of the electronic device. According to one exemplary embodiment, the electronic device may make data associated with a main function or data outputted to an execution screen of the main function into sharing data and transmit the sharing data to the peripheral device. For example, the electronic device may execute a plurality of functions through a first execution screen of the electronic device, a second execution screen thereof, and a third execution screen thereof. In one example, the electronic device may execute a web browser by the first execution screen of the electronic device, and play back media data by the second execution screen of the electronic device, and execute an electronic mail by the third execution screen of the electronic device. In a state in which the second xecution screen is set as the main function, if checking the proximity of a peripheral device, the electronic device may check media data played back by the second execution screen of the electronic device as sharing data.

In operation 407, the electronic device may share data based on the sharing scheme. According to various exemplary embodiments, the electronic device may share data using a communication scheme being the same as or different from a communication scheme having been used for determining the proximity of the second electronic device. For example, the electronic device may perform determination of the proximity of the second electronic device and data sharing with the second electronic device based on a first communication scheme (for example, one communication scheme among a BLE scheme, a Bluetooth scheme, and an NFC scheme). For another example, the electronic device may perform determination of the proximity of the second electronic device based on the first communication scheme, and perform data sharing with the second electronic device based on a second communication scheme (for example, a WiFi scheme).

According to various exemplary embodiments, the electronic device may have at least one or more sensing regions sensing the proximity of the second electronic device. Here, the sensing region may be associated with a communication module. According to various exemplary embodiments, the electronic device may use only at least some of a plurality of communication modules to sense the proximity of the second electronic device. For example, the electronic device may use at least some of the plurality of communication modules to sense the proximity of the second electronic device for data sharing and may use the remaining communication modules for a predefined function (for example, a connection function, a payment function, etc.).

FIG. 5 is a flowchart illustrating a data sharing operation of an electronic device according to various exemplary embodiments.

Referring to FIG. 5, the electronic device may operate as a tag and communicate with a peripheral device operating as a reader for data sharing. According to various exemplary embodiments, the electronic device may also operate as the reader communicate with a peripheral device operating as the tag for data sharing. Further, among a related description of FIG. 5, the same or similar portion to the description of FIG. 4 is omitted.

In operation 501, the electronic device may check the proximity of a peripheral device, for example, a second electronic device. According to one exemplary embodiment, the electronic device may check the proximity of the second electronic device based on a first communication scheme.

In operation 503, the electronic device may check a sharing scheme associated with a region which a peripheral device approaches, for example, a region to which the second electronic device is tagged. For example, checking the sharing scheme may be checking data to be shared.

According to one exemplary embodiment, the electronic device may check, as sharing data, data associated with a position corresponding to a wireless communication module sensing the proximity of a peripheral device. For example, the electronic device may sense the proximity of the peripheral device to four directions using four wireless communication modules, and may define data associated with each direction. The electronic device may check, as sharing data to be transmitted to the peripheral device, data defined for a position of a wireless communication module sensing the proximity of the peripheral device.

According to another exemplary embodiment, the electronic device may associate a position which the peripheral device approaches with an output screen of the electronic device. For example, the electronic device may check, as sharing data, data associated with a screen outputted to the position which the peripheral device approaches. Here, the screen may be associated with a position of a communication module sensing the proximity of the second electronic device. For one example, in a state in which first data associated with a first screen, second data associated with a second screen, and third data associated with a third screen are sharable, if sensing a peripheral device approaching the first screen, the electronic device may determine that the first data associated with the first screen is sharable with the peripheral device.

In operation 505, the electronic device may share data based on the sharing scheme. According to various exemplary embodiments, the electronic device may share data based on a first communication scheme or a second communication scheme different from the first communication scheme.

FIG. 6A to FIG. 6B are diagrams illustrating a data sharing operation of an electronic device according to various exemplary embodiments.

At peripheral device's approaching, the electronic device may check data to be shared based on setting of an output screen of the electronic device. According to various exemplary embodiments, the electronic device may output a plurality of execution screens. According to one exemplary embodiment, the electronic device may divide a display into a plurality of regions, and output different execution screens to the respective divided regions. For example, the electronic device may output a first content execution screen through a first region of the display, and output a second content execution screen through a second region of the display. Further, based on the proximity of an external device to the electronic device, the electronic device may process to share at least one of first content or second content with the external device, such that the at least one content may be displayed through the external device.

Further, the electronic device may define a main screen among outputted execution screens. The remaining screens excepting the main screen among a plurality of execution screens may be sub screens. According to various exemplary embodiments, the electronic device may output the execution screen defined as the main screen and the execution screens defined as the sub screens the way that they are distinguished from one another. For example, the electronic device may give visual display to the main screen, for example, give effect to a window frame, or output a mark (e.g., an icon, etc.) representing the main screen within the execution screen.

According to various exemplary embodiments, the main screen may be a screen associated with sharing data to be transmitted to the peripheral device. According to another exemplary embodiment, the sub screen may be also associated with the sharing data to be transmitted to the peripheral device.

FIG. 6A illustrates a screen of an electronic device 600 outputting a main screen 620 and a sub screen 610. FIG. 6A illustrates a situation in which a bolded edge effect 622 is applied to a frame of a media playback screen corresponding to the main screen 620 so that the media playback screen corresponding to the main screen 620 is more emphasized than a web search screen corresponding to the sub screen 610.

According to various exemplary embodiments, at data sharing, the electronic device 600 may check, as sharing data, data associated with a screen being set as the main screen 620 among outputted screens of the electronic device.

According to one exemplary embodiment, as illustrated in FIG. 6B, if sensing the proximity of a peripheral device 650, the electronic device may transmit data associated with a main screen to the peripheral device 650. For example, the electronic device may process to transmit a media file played back through the main screen to the peripheral device 650 such that sharing data is stored in the peripheral device or is played back (652) through the peripheral device 650.

In a description of the drawings, sharing the data associated with the main screen has been described. However, according to various exemplary embodiments, if sensing the proximity of the peripheral device, the electronic device may also check, as the sharing data, data associated with a screen being set as a sub screen of the electronic device.

According to various exemplary embodiments, the electronic device may perform determination of the proximity of a peripheral device and data sharing with the peripheral device based on a first communication scheme (for example, one communication scheme among a BLE scheme, a Bluetooth scheme, and an NFC scheme). In another example, the electronic device may perform the determination of the proximity of the peripheral device based on the first communication scheme, and perform the data sharing with the peripheral device based on a second communication scheme (for example, a WiFi scheme).

FIG. 7A to FIG. 7C are diagrams illustrating a data sharing operation of an electronic device according to various exemplary embodiments.

The electronic device may check data to be shared based on a proximity position of a peripheral device. For example, the electronic device may include a plurality of wireless communication modules having certain coverage, and may check, as sharing data, data associated with a position corresponding to a wireless communication module sensing the proximity of the peripheral device among a plurality of wireless communication modules.

According to one exemplary embodiment, the electronic device may divide an output screen of the electronic device into a plurality of regions, and have a wireless communication module which has each divided region as coverage. According to another exemplary embodiment, the electronic device may have a wireless communication module which has each side surface of the electronic device as coverage.

The illustrated figure is a figure of an electronic device 700 outputting a first screen 710 and a second screen 720, and may illustrate a situation of outputting a web search screen through the first screen 710 and playing back media data through the second screen 720.

The electronic device 700 may include a first wireless communication module having coverage associated with the first screen 710 and a second wireless communication module having coverage associated with the second screen 720. Each wireless communication module may sense a radio signal received within each coverage, and sense the proximity of a peripheral device to check sharing data. According to various exemplary embodiments, the electronic device may also include a third wireless communication module for data sharing. In this case, the electronic device may sense the proximity of a peripheral device using the first wireless communication module or the second wireless communication module and, in response to sensing the proximity of the peripheral device, transmit/receive data with the peripheral device using the third wireless communication module. According to one exemplary embodiment, the third wireless communication module may operate in response to sensing the proximity of the peripheral device.

According to one exemplary embodiment, if sensing the proximity of the peripheral device through the first wireless communication module, the electronic device 700 may transmit data defined in association with the first wireless communication module, to the peripheral device. For example, as illustrated in FIG. 7B, as sensing the proximity of a peripheral device 750 through the first wireless communication module associated with the web search screen of the electronic device, the electronic device 700 may transmit data (e.g., a Uniform Resource Locator (URL) address and a search result screen) associated with the web search screen to the peripheral device 750.

According to another exemplary embodiment, if sensing the proximity of a peripheral device through the second wireless communication module, the electronic device 700 may transmit data defined in association with the second wireless communication module to the peripheral device. For example, as illustrated in FIG. 7C, as sensing the proximity of the peripheral device 750 through the second wireless communication module associated with a media data playback screen, the electronic device 700 may transmit data associated with media data which is being played back to the peripheral device 750.

FIG. 8A to FIG. 8C illustrate a data sharing operation of an electronic device according to various exemplary embodiments. Further, among a related description of FIG. 8, the same or similar portion to the description of FIG. 7 is omitted.

The electronic device may check data to be shared based on a proximity position of a peripheral device. According to one exemplary embodiment, the electronic device may include a wireless communication module which has a front surface and rear surface of the electronic device as coverage.

The illustrated figure is a figure of an electronic device 800 outputting a first screen 802 and a second screen 804, and may illustrate a situation of outputting a web search screen through the first screen 802 and playing back media data through the second screen 804.

The electronic device 800 may include a first wireless communication module which has coverage associated with a first direction, for example, a front surface of the electronic device and a second wireless communication module which has coverage associated with a second direction, for example, a rear surface of the electronic device. Each wireless communication module may sense a radio signal received within each coverage and sense the proximity of the peripheral device to check sharing data.

According to one exemplary embodiment, if sensing the proximity of a peripheral device to a first direction, the electronic device may transmit data defined in association with the first direction to the peripheral device. For example, as illustrated in FIG. 8B, the electronic device 800 may transmit data associated with a web search screen 812 to a peripheral device 810.

According to another exemplary embodiment, if sensing the proximity of a peripheral device to a second direction, the electronic device may transmit data defined in association with the second direction to the peripheral device. For example, as illustrated in FIG. 8C, the electronic device 800 may transmit data associated with media data 814 which is being played back to the peripheral device 810.

FIG. 9 is a flowchart illustrating a data output operation of an electronic device according to various exemplary embodiments.

Referring to FIG. 9, the electronic device may operate as a tag and communicate with a peripheral device operating as a reader for data sharing. According to various exemplary embodiments, the electronic device may also operate as the reader and communicate with a peripheral device operating as a tag for data sharing.

In operation 901, the electronic device may check the proximity of a peripheral device, for example, a second electronic device.

In operation 903, the electronic device may perform a sharing operation with the peripheral device. According to various exemplary embodiments, as the peripheral device approaches, the electronic device may receive sharing data from the peripheral device and store the sharing data.

In operation 905, the electronic device may check a sharing data output region.

According to various exemplary embodiments, the electronic device may check a data output region based on a proximity position of the peripheral device. For example, the electronic device may check, as the data output position, a position associated with a position corresponding to a wireless communication module sensing the proximity of the peripheral device. For example, in a state in which a first output position associated with a position of a first wireless communication module, a second output position associated with a position of a second wireless communication module, etc. are defined, if sensing a peripheral device approaching the position of the first wireless communication module, the electronic device may determine that it outputs data shared with the peripheral device to the first output position associated with the position of the first wireless communication module. In another example, the electronic device may associate a position which the peripheral device approaches with an output screen of the electronic device. For example, in a state in which a first output position associated with a first screen, a second output position associated with a second screen, etc. are defined, if sensing a peripheral device approaching the first screen, the electronic device may determine that it outputs data shared with the peripheral device to the first output position associated with the first screen.

According to various exemplary embodiments, at peripheral device's approaching, the electronic device may check a data output region based on setting of an output screen of the electronic device. For example, at a data sharing time point, the electronic device may check, as the data output position, a position associated with a screen being set as a main screen among outputted screens of the electronic device.

In operation 907, the electronic device may output shared data based on the checked output region.

FIG. 10 is a diagram illustrating a data output operation of an electronic device according to various exemplary embodiments.

The electronic device may output shared data in a state of maintaining a current execution screen. According to one exemplary embodiment, the electronic device may additionally output the shared data to a portion of the execution screen. For example, the electronic device may output the shared data in a pop-up form.

The illustrated figure is a figure of an electronic device outputting a web screen 1001. The electronic device may receive sharing data from a peripheral device and output the received data in a state of outputting the web screen 1001. For example, if the electronic device receives image data from the peripheral device, the electronic device may generate an output region of a pop-up form in a portion of the web screen 1001, and output (1003) the received image data to the generated output region. According to various exemplary embodiments, the electronic device may generate the output region in a proximity position of the peripheral device. According to one exemplary embodiment, the proximity position of the peripheral device may be associated with a position of a wireless communication module sensing the proximity of the peripheral device.

FIG. 11 is a diagram illustrating a data output operation of an electronic device according to various exemplary embodiments.

The electronic device may output shared data in a state of maintaining a current execution screen. According to one exemplary embodiment, the electronic device may additionally output the shared data to a portion of the execution screen. For example, the electronic device may change a form (i.e., size) of a window (i.e., frame) of the execution screen and output the shared data to the changed execution screen. For example, the electronic device may change a window form of a previous execution screen to newly generate a window capable of outputting the shared data.

The illustrated figure is a figure of an electronic device outputting the web screen 1101. The electronic device may receive sharing data from a peripheral device and output the received sharing data in a state of outputting the web screen 1101. For example, if the electronic device receives image data from the peripheral device, the electronic device may process to adjust a size of a window of a web screen which has been outputted in a full size, to a predefined size, and output the size-adjusted window together with a window 1103 for playing back image data.

FIG. 12 is a diagram illustrating a data output operation of an electronic device according to various exemplary embodiments.

The electronic device may check an output region of sharing data based on setting of an output screen of the electronic device.

For example, the electronic device may output a plurality of execution screens, and may define a main screen among the outputted execution screens. According to one exemplary embodiment, the main screen may be a screen having higher priority than the other screens. For example, the main screen may be a screen defined to be outputted to an upper side all the time without being hidden by the other screens.

According to various exemplary embodiments, the electronic device may process to output shared data, which is received from the peripheral device, to other screens with exception of the main screen. In contrast, the electronic device may process to output the shared data, which is received from the peripheral device, to the main screen.

For example, the electronic device may receive and output shared data to a main screen 1203 in a state of outputting a web search screen (e.g., sub screen) 1201 and a media data playback screen (e.g., main screen) 1203.

FIG. 13A to FIG. 13B are diagrams illustrating a data output operation of an electronic device according to various exemplary embodiments.

According to various exemplary embodiments, the electronic device may sense the proximity of a peripheral device using a plurality of wireless communication modules.

As illustrated in FIG. 13A, the electronic device 1300 may include four wireless communication modules 1302, 1304, 1306, and 1308. According to various exemplary embodiments, the electronic device 1300 may sense the proximity of a peripheral device using at least one wireless communication module. For example, as shown, the electronic device 1300 may sense (1310) the proximity of the peripheral device using three wireless communication modules 1304, 1306, and 1308 among the four wireless communication modules 1302, 1304, 1306, and 1308. Further, the electronic device 1300 may process to stop an operation of the wireless communication module 1302 not used for sensing the proximity of the peripheral device or perform a predefined function (for example, a connection function, a payment function, etc.).

As illustrated in FIG. 13B, the electronic device may share or not share data based on setting of a wireless communication module that is operating.

For example, if a wireless communication module 1306 sensing a peripheral device 1340 is set to sense the proximity of the peripheral device 1340 in a state of outputting a web search screen 1320 and a media data playback screen 1330, the electronic device may share the web search screen 1320 associated with the wireless communication module 1306 sensing the proximity of the peripheral device 1340. In another example, if a wireless communication module 1302 sensing a peripheral device 1350 is not set to sense the proximity of the peripheral device 1350, the electronic device may not share data with the peripheral device 1350.

FIG. 14A to FIG. 14B are diagrams illustrating a data output operation of an electronic device according to various exemplary embodiments.

According to various exemplary embodiments, the electronic device may sense the proximity of a peripheral device using a plurality of wireless communication modules.

As illustrated in FIG. 14A, the electronic device 1400 may include four wireless communication modules 1402, 1404, 1406, and 1408. According to various exemplary embodiments, the electronic device 1400 may associate at least one wireless communication module with sharing data. For example, as shown, the electronic device 1400 may associate two wireless communication modules 1402 and 1406 among the four wireless communication modules 1402, 1404, 1406, and 1408 with first sharing data, and associate the remaining wireless communication modules 1404 and 1408 with second sharing data. According to one exemplary embodiment, the sharing data may be associated with an output screen of the electronic device.

As illustrated in FIG. 14B, the electronic device may share data based on setting of a wireless communication module that is operating.

For example, if a wireless communication module 1402 or a wireless communication module 1406 sensing a peripheral device 1440 is associated with first sharing data in a state of outputting a web search screen 1420 and a media data playback screen 1430, the electronic device may process to share the first sharing data. Though not illustrated, in a state in which the wireless communication module 1402 and a wireless communication module 1404 are associated with first sharing data and the wireless communication module 1406 and a wireless communication module 1408 are associated with second sharing data, if the proximity of a peripheral device is sensed by the wireless communication module 1402 or the wireless communication module 1404, the electronic device may share the first sharing data with the peripheral device data and, if the proximity of the peripheral device is sensed by the wireless communication module 1406 or the wireless communication module 1408, the electronic device may share the second sharing data with the peripheral device.

According to various exemplary embodiments, an operation method of an electronic device may include the operations of sensing the proximity of a second electronic device, in response to the proximity of the second electronic device, acquiring information associated with at least one of a proximity position of the second electronic device and a setting state of an execution screen of the electronic device, and determining sharing data based on the acquired information.

According to various exemplary embodiments, the proximity position of the second electronic device may include a position associated with a communication module sensing the proximity of the second electronic device.

According to various exemplary embodiments, the setting state of the execution screen may include information associated with a screen which is set as a main screen or sub screen among a plurality of outputted screens of the electronic device.

According to various exemplary embodiments, the operation method of the electronic device may include the operation of determining an output position of the sharing data based on the acquired information.

According to various exemplary embodiments, the operation method of the electronic device may further include the operation of sharing the determined sharing data with the second electronic device, and further include the operation of sensing the proximity of the second electronic device based on a first communication scheme, and sharing the sharing data based on a second communication scheme.

According to various exemplary embodiments, the operation method of the electronic device may further include the operation of checking a proximity position of the second electronic device based on a strength of a received signal associated with the second electronic device.

According to various exemplary embodiments, the operation method of the electronic device may further include the operation of, if the same communication module of the second electronic device is searched from at least two communication modules, determining the sharing data based on the proximity position of the second electronic device associated with the communication module whose detected signal strength is high.

A method for controlling and an electronic device for processing the method according to various exemplary embodiments of the present invention may, for example, determine sharing data based on information associated with at least one of a proximity position of a second electronic device and a setting state of an execution screen, in response to the proximity of the second electronic device, thereby making possible various kinds of data sharing.

While the invention has been shown and described with reference to certain preferred embodiments thereof, it will be understood by those skilled in the art that various changes in form and details may be made therein without departing from the spirit and scope of the invention as defined by the appended claims.

The invention claimed is:

1. A first electronic device comprising:
a display including a plurality of regions;
a plurality of communication modules respectively disposed under the plurality of regions; and
at least one processor configured to:
display, within an entire area of the display that includes the plurality of regions, a first content,
detect that a second electronic device is tagging a first region from among the plurality of regions by using a first communication module disposed under the first region from among the plurality of regions,
in response to detecting of the tagging,
receive, from the second electronic device, a second content being displayed on the second electronic device, by using the first communication module, and
display, within the first region, the second content superimposed on the first content which is displayed on the display of the electronic device.

2. The first electronic device of claim 1, wherein the at least one processor is further configured to:
receive, from the second electronic device, a signal via the plurality of communication modules,
acquire a plurality of signal values corresponding to each of the plurality of communication modules,
identify the first communication module having a greatest signal value among the plurality of signal values,
wherein each of the plurality of signal values indicates a receive strength for the signal at each of the plurality of communication modules.

3. The first electronic device of claim 1, wherein the second content is displayed in a form of pop-up display.

4. The first electronic device of claim 1, wherein the at least one processor is configured to:
determine whether a second region included in the plurality of regions is predefined as a main region,
if the second region is predefined as the main region, display the second content on the second region, and
if the second region is not predefined as the main region, display the second content on the first region corresponding to the first communication module which is used to detect the second electronic device.

5. The first electronic device of claim 4, wherein the main region is displayed with a highlighted outline.

6. The first electronic device of claim 1, wherein the at least one processor is configured to detect the second electronic device which approaches the first electronic device in at least one of up, down, left, right, front, and rear directions of the first electronic device, and
wherein the first communication module is a communication module which is closest to the second electronic device from among the plurality of communication modules.

7. The first electronic device of claim 1, wherein the first communication module detects the second electronic device based on at least one of bluetooth low energy (BLE), bluetooth, and near field communication (NFC), and
wherein a second communication module from among the plurality of communication modules is based on wireless fidelity (WiFi) for receiving the information regarding the second content.

8. An operation method of a first electronic device, the method comprising the operations of:
displaying, within an entire area of a display of the first electronic device, a first content, wherein the display includes a plurality of regions, and wherein a plurality of communication modules are respectively disposed under the plurality of regions;
detecting that a second electronic device is tagging a first region from among the plurality of regions by using a first communication module disposed under the first region from among the plurality of regions;
in response to detecting of the tagging, receiving, from the second electronic device, a second content being displayed on the second electronic device, by using the first communication module; and
displaying, on the first region, the second content superimposed on the first content which is displayed on the display of the first electronic device.

9. The method of claim 8, further comprising:
receiving, from the second electronic device, a signal via the plurality of communication modules;
acquiring a plurality of signal values corresponding to each of the plurality of communication modules; and identifying the first communication module having a greatest signal value among the plurality of signal values,
wherein each of the plurality of signal values indicates a receive strength for the signal at each of the plurality of communication modules.

10. The method of claim 8, wherein the second content is displayed in a form of pop-up display.

11. The method of claim 8, further comprising:
determining whether a second region included in the plurality of regions is predefined as a main region;
displaying the second content on the second region if the second region is predefined as the main region; and
displaying the second content on the first region corresponding to the first communication module which is used to detect the second electronic device, if the second region is not predefined as the main region.

12. The method of claim 11, wherein the main region is displayed with a highlighted outline.

13. The method of claim 8, further comprising detecting the second electronic device which approaches the first electronic device in at least one of up, down, left, right, front, and rear directions of the first electronic device,
wherein the first communication module is a communication module which is closest to the second electronic device from among the plurality of communication modules.

14. The method of claim 8, wherein the first communication module detects the second electronic device based on at least one of bluetooth low energy (BLE), bluetooth, and near field communication (NFC), and
wherein a second communication module from among the plurality of communication modules is based on wireless fidelity (Wi-Fi) for receiving the information regarding the second content.

15. A first electronic device comprising:
a display including a plurality of regions;
a plurality of communication modules respectively disposed under the plurality of regions; and
at least one processor configured to:
display a first content within a first region from among the plurality of regions, and a second content within a second region from among the plurality of regions,
detect that a second electronic device is tagged to the first electronic device by using a first communication module disposed under the first region from among the plurality of regions, and
in response to detecting of the second electronic device, transmit, to the second electronic device, information regarding the first content which is displayed on the first region.

16. The first electronic device of claim 15, wherein the first content which is transmitted to the second electronic device, is displayed on a display of the second electronic device, based on the information by the second electronic device, and
wherein the first communication module is a communication module which is closest to the second electronic device from among the plurality of communication modules.

17. The first electronic device of claim 15, wherein the at least one processor is further configured to:
determine whether a main region is predefined as one of the first region or the second region,
transmit, to the second electronic device, the first content according to detecting of the second electronic device, if the first region is predefined as the main region, and
transmit, to the second electronic device, the second content according to detecting of the second electronic device, if the second region is predefined as the main region.

18. The first electronic device of claim 17, wherein the main region is displayed with a highlighted outline.

19. The first electronic device of claim 15, wherein the at least one processor is further configured to:
receive, from the second electronic device, a signal via the plurality of communication modules,
acquire each of a plurality of signal values corresponding to each of the plurality of communication modules, and
identify the first communication module having a greatest signal value among the plurality of signal values,
wherein each of the plurality of signal values indicates a receive strength for the signal at each of the plurality of communication modules.

* * * * *